United States Patent
Chen et al.

(10) Patent No.: US 12,219,492 B2
(45) Date of Patent: Feb. 4, 2025

(54) SYSTEM AND METHOD FOR TRAFFIC TYPE DETECTION AND WI-FI TARGET WAKE TIME PARAMETER DESIGN

(71) Applicant: Samsung Electronics Co., Ltd., Suwon-si (KR)

(72) Inventors: Guanbo Chen, McKinney, TX (US); Abhishek Sehgal, Plano, TX (US); Wenxun Qiu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 17/657,940

(22) Filed: Apr. 4, 2022

(65) Prior Publication Data

US 2022/0369232 A1  Nov. 17, 2022

Related U.S. Application Data

(60) Provisional application No. 63/185,818, filed on May 7, 2021, provisional application No. 63/184,595, filed on May 5, 2021.

(51) Int. Cl.
*H04W 52/02* (2009.01)
*H04L 47/2441* (2022.01)
*H04W 84/12* (2009.01)

(52) U.S. Cl.
CPC ..... *H04W 52/0248* (2013.01); *H04L 47/2441* (2013.01); *H04W 84/12* (2013.01)

(58) Field of Classification Search
None
See application file for complete search history.

(56) References Cited

U.S. PATENT DOCUMENTS

| | | |
|---|---|---|
| 7,321,555 B2 | 1/2008 | Rodriguez et al. |
| 7,920,485 B2 | 4/2011 | Tung |
| 10,368,309 B2 | 7/2019 | Kang et al. |
| 10,819,583 B2 | 10/2020 | Chen et al. |
| 2016/0283859 A1 | 9/2016 | Fenoglio et al. |
| 2017/0265130 A1 | 9/2017 | Kakani |
| 2018/0288702 A1* | 10/2018 | Kang ............ H04W 52/0225 |
| 2019/0253968 A1* | 8/2019 | Xiao ............ H04L 47/28 |
| 2019/0294995 A1 | 9/2019 | Pastor Perales et al. |

(Continued)

FOREIGN PATENT DOCUMENTS

WO  2020085997 A1  4/2020

OTHER PUBLICATIONS

Pong P. Chu. 2006. Finite State Machine: Principle and Practice. In: RTL Hardware Design Using VHDL: Coding for Efficiency, Portability, and Scalability. Wiley-IEEE Press. p. 313-371. (Year: 2006).*

(Continued)

*Primary Examiner* — Mohammad S Anwar
*Assistant Examiner* — Kathryn Chang

(57) ABSTRACT

A method includes obtaining statistical information of incoming network traffic. The method also includes using a state machine to classify the incoming network traffic as a traffic pattern based on the statistical information. The method further includes using the traffic pattern to adapt one or more Target Wakeup Time (TWT) parameters to optimize power consumption of a Wi-Fi station. The traffic pattern includes at least one of bursty traffic, random traffic, and stable traffic.

20 Claims, 20 Drawing Sheets

(56) References Cited

U.S. PATENT DOCUMENTS

| | | |
|---|---|---|
| 2019/0364110 A1 | 11/2019 | Henry et al. |
| 2020/0084102 A1 | 3/2020 | Choi et al. |
| 2020/0137612 A1 | 4/2020 | Li et al. |
| 2020/0413284 A1 | 12/2020 | Vargantwar et al. |
| 2021/0044572 A1 | 2/2021 | Liu et al. |

OTHER PUBLICATIONS

International Search Report and Written Opinion issued Aug. 8, 2022 regarding International Application No. PCT/KR2022/006433, 8 pages.

* cited by examiner

SYSTEM AND METHOD FOR TRAFFIC TYPE DETECTION AND WI-FI TARGET WAKE TIME PARAMETER DESIGN

CROSS-REFERENCE TO RELATED APPLICATIONS AND CLAIM OF PRIORITY

The present application claims priority under 35 U.S.C. § 119(e) to U.S. Provisional Patent Application No. 63/184,595 filed on May 5, 2021, and U.S. Provisional Patent Application No. 63/185,818 filed on May 7, 2021, which are hereby incorporated by reference in their entirety.

TECHNICAL FIELD

The present disclosure relates generally to wireless communication systems and, more specifically, the present disclosure relates to a system and method for traffic type detection and Wi-Fi target wake time parameter design.

BACKGROUND

With the standardization process of the next generation IEEE 802.11 wireless local area network (WLAN), i.e., IEEE 802.11ax amendment entering the final stage, the IEEE 802.11ax amendment is drawing attention of the information technology (IT) industry. It newly introduces features for improving peak throughput and efficiency in an environment crowded by many 802.11 devices. Example environments include airports, stadiums, and so on. Wi-Fi alliance (WFA) has already launched the Wi-Fi 6 certification program for guaranteeing interoperability between certified products implementing IEEE 802.11ax amendment. In the market, device manufacturers are already starting to release Wi-Fi 6 certified smart mobile devices.

Target Wake Time (TWT) is one of the important features of the IEEE 802.11ax amendment. TWT enables wake time negotiation between an access point (AP) and an associated station (STA) for improving power efficiency. The wake time negotiation gives rise to TWT sessions (e.g., consecutive TWT sessions), where the STA wakes up at pre-negotiated times and for specified durations of time to communicate with the AP (e.g., via UL and/or DL communications). The IEEE 802.11ax amendment allows for periodic awakening, non-periodic awakening, and at-will awakening by the STA.

SUMMARY

The present disclosure relates to wireless communication systems and, more specifically, to a system and method for traffic type detection and Wi-Fi target wake time parameter design.

In one embodiment, a method includes obtaining statistical information of incoming network traffic. The method also includes using a state machine to classify the incoming network traffic as a traffic pattern based on the statistical information. The method further includes using the traffic pattern to adapt one or more Target Wakeup Time (TWT) parameters to optimize power consumption of a Wi-Fi station. The traffic pattern includes at least one of bursty traffic, random traffic, and stable traffic.

In another embodiment, a device includes a memory configured to store instructions. The device also includes a processor operably connected to the memory. The processor is configured when executing the instructions to: obtain statistical information of incoming network traffic; use a state machine to classify the incoming network traffic as a traffic pattern based on the statistical information; and use the traffic pattern to adapt one or more TWT parameters to optimize power consumption of a Wi-Fi station. The traffic pattern includes at least one of bursty traffic, random traffic, and stable traffic.

In yet another embodiment, a non-transitory computer readable medium includes a plurality of instructions. The plurality of instructions, when executed by at least one processor, is configured to cause the at least one processor to: obtain statistical information of incoming network traffic; use a state machine to classify the incoming network traffic as a traffic pattern based on the statistical information; and use the traffic pattern to adapt one or more TWT parameters to optimize power consumption of a Wi-Fi station. The traffic pattern includes at least one of bursty traffic, random traffic, and stable traffic.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another, or can operate as standalone schemes.

Figure 1:
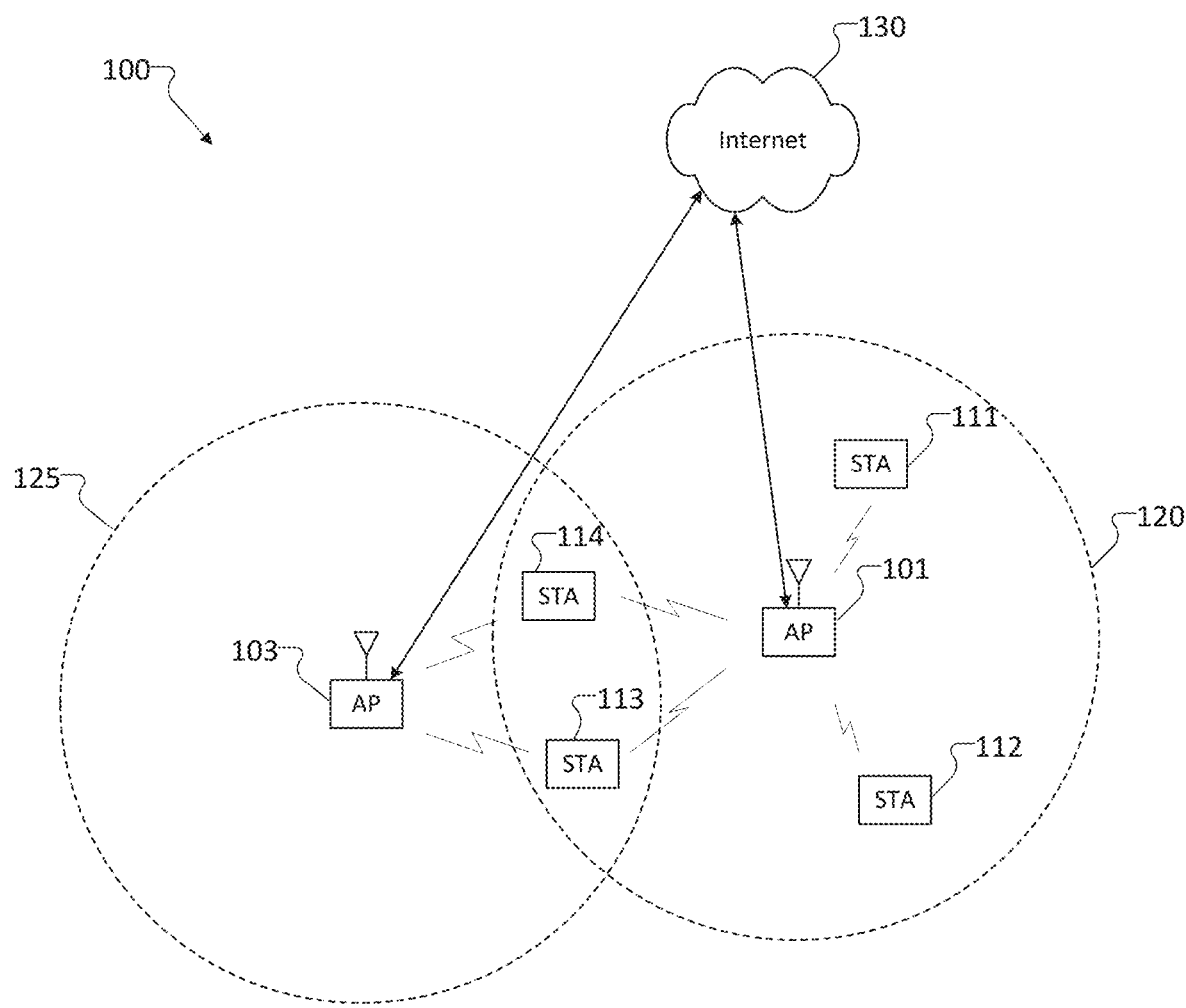
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for determining parameters for target wake time (TWT) operations in WLANs (e.g., the TWT interval). Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
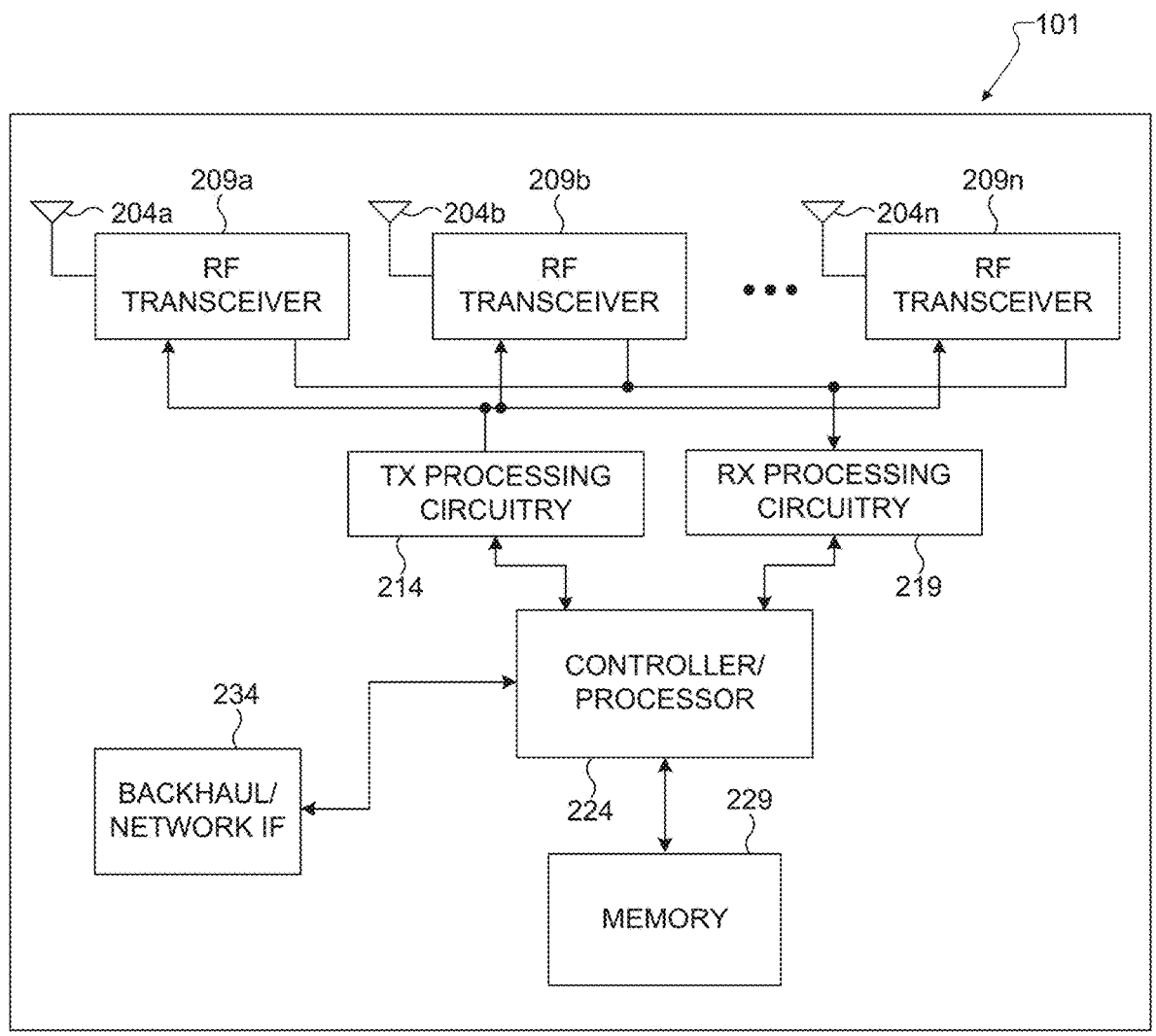
FIG. 2A illustrates an example AP according to embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of uplink channel signals and the transmission of downlink channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including determining parameters for TWT operations. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for determining parameters for TWT operations in WLANs (e.g., the TWT interval). Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
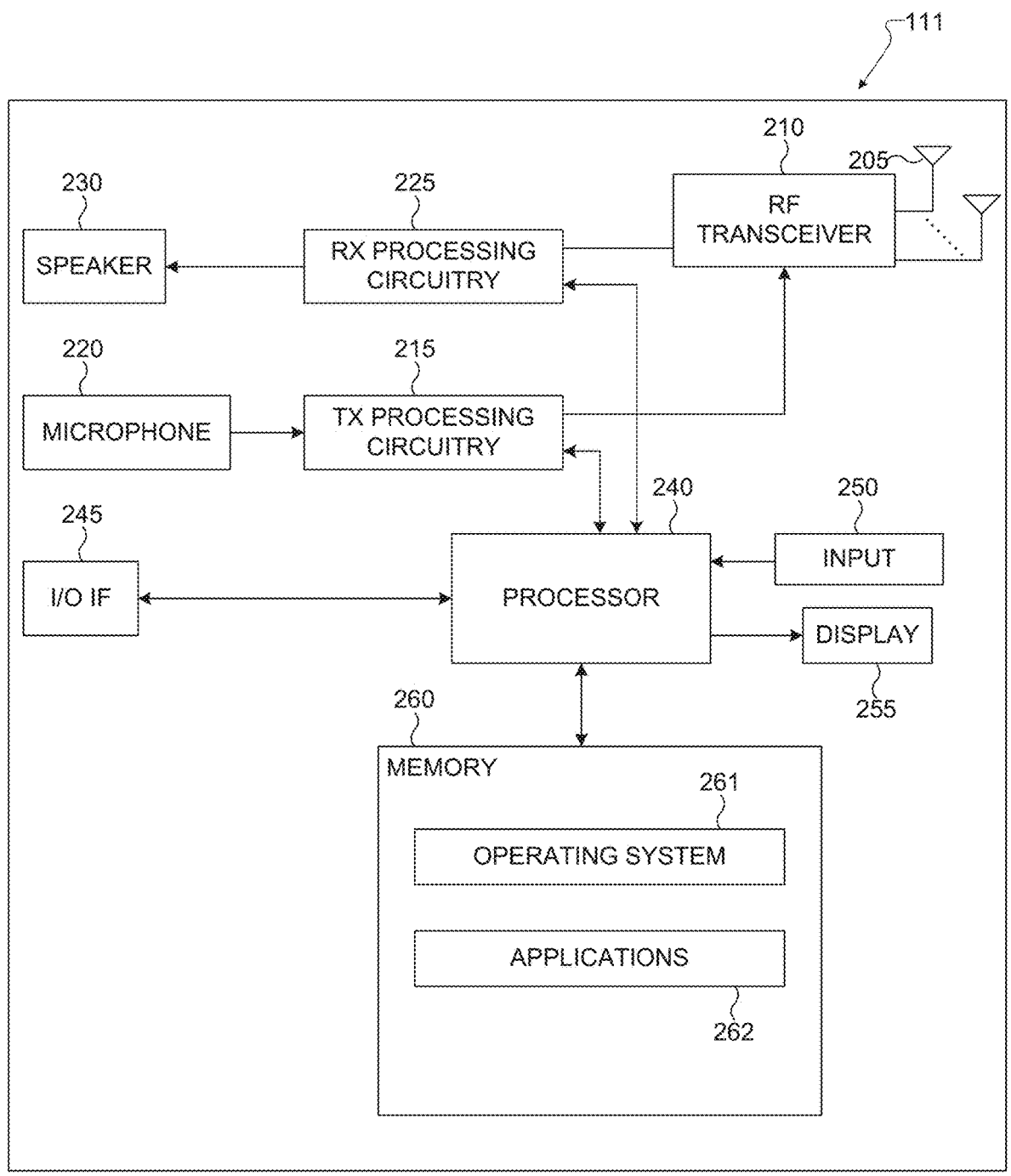
FIG. 2B illustrates an example STA according to embodiments of the present disclosure.

FIG. 2B illustrates an example STA 111 according to various embodiments of this disclosure. The embodiment of the STA 111 illustrated in FIG. 2B is for illustration only, and the STAs 112-114 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of downlink channel signals and the transmission of uplink channel signals by the RF transceiver 210, the RX processing circuitry 225, and the TX processing circuitry 215 in accordance with well-known principles. The main controller/processor 240 can also include processing circuitry configured to determine parameters for TWT operations in WLANs (e.g., the TWT interval). In some embodiments, the controller/processor 240 includes at least one microprocessor or microcontroller.

The controller/processor 240 is also capable of executing other processes and programs resident in the memory 260, such as operations for determining parameters for TWT operations in WLANs. The controller/processor 240 can move data into or out of the memory 260 as required by an executing process. In some embodiments, the controller/processor 240 is configured to execute a plurality of applications 262, such as applications for determining an idle or active state of the Wi-Fi link, and determining TWT parameters such as the TWT interval for TWT operation. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
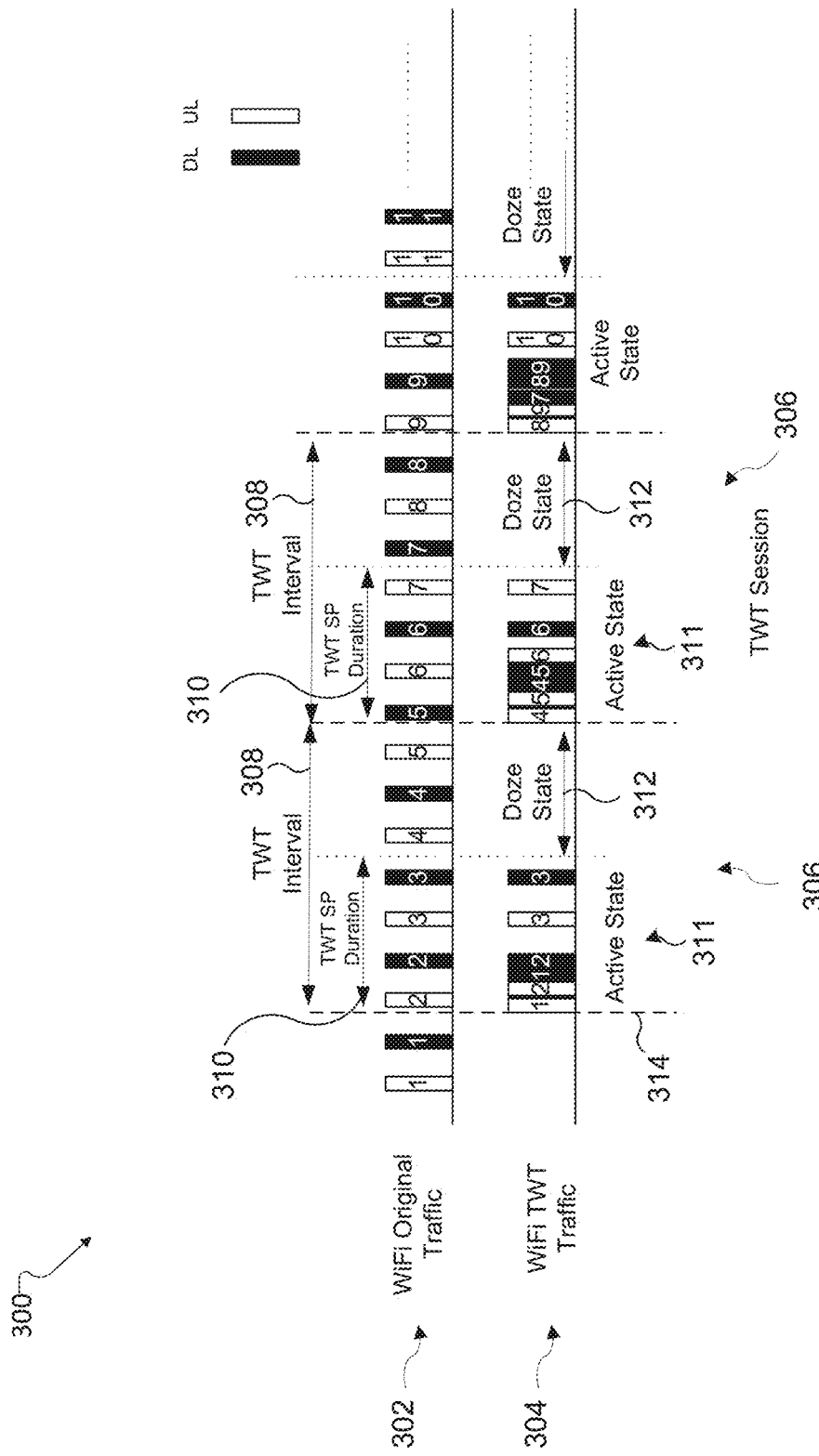
FIG. 3 illustrates a diagram of packet exchange between devices according to embodiments of the present disclosure.

FIG. 3 illustrates a diagram 300 of packet exchange between devices according to embodiments of the present disclosure. For the purposes of this disclosure, the figures will be discussed from the point of view of a STA, which may be a STA 111, but it is understood that it could be any suitable wireless communication device.

FIG. 3 illustrates two scenarios of exchange of uplink (UL) communication packets and downlink (DL) communication packets (which may be collectively referred to as traffic) between an AP and an associated client STA. First, without wake time negotiation between the AP and the STA (e.g., as seen in the top graph 302), and second, with wake time negotiation between the AP and the STA (e.g., in an IEEE 802.11ax system and as seen in the bottom graph 304). In the top graph 302, there is a regular stream of non-buffered traffic between the AP and the STA, with UL packets being interspersed with DL packets. In this scenario (i.e., without wake time negotiation) there is no option for the STA to enter a doze state or a power save state.

By contrast, in the bottom graph 304, wake time negotiation gives rise to consecutive TWT sessions 306. Each TWT session 306 is defined as the time period from the beginning of a TWT interval 308 to the end of the TWT interval 308. Each TWT session 306 includes two states: an active state 311, defined by a TWT service period (SP) duration 310 (during which the STA is awake to communicate with the AP), and a power save state or doze state 312 (during which the STA is not actively awake or communicating with the AP). As a result of wake time negotiation, power efficiency at the STA is improved without adding too much latency or allowing UL or DL packets to be dropped.

In wake time negotiation, the negotiated TWT parameters include the wake interval (e.g., the TWT interval 308 for each TWT session 306), wake duration (e.g. the TWT SP duration 310 for each TWT session 306), and initial wake time or offset (e.g., indicated by the TWT start time 314). These negotiated parameters highly affect latency, throughput, and power efficiency, which are directly related to the QoS (quality of service) a customer experiences. Services with different traffic characteristics can have different TWT parameter configurations for better QoS. Additionally, the TWT configuration should adapt to network and service status variation.

Figure 4:
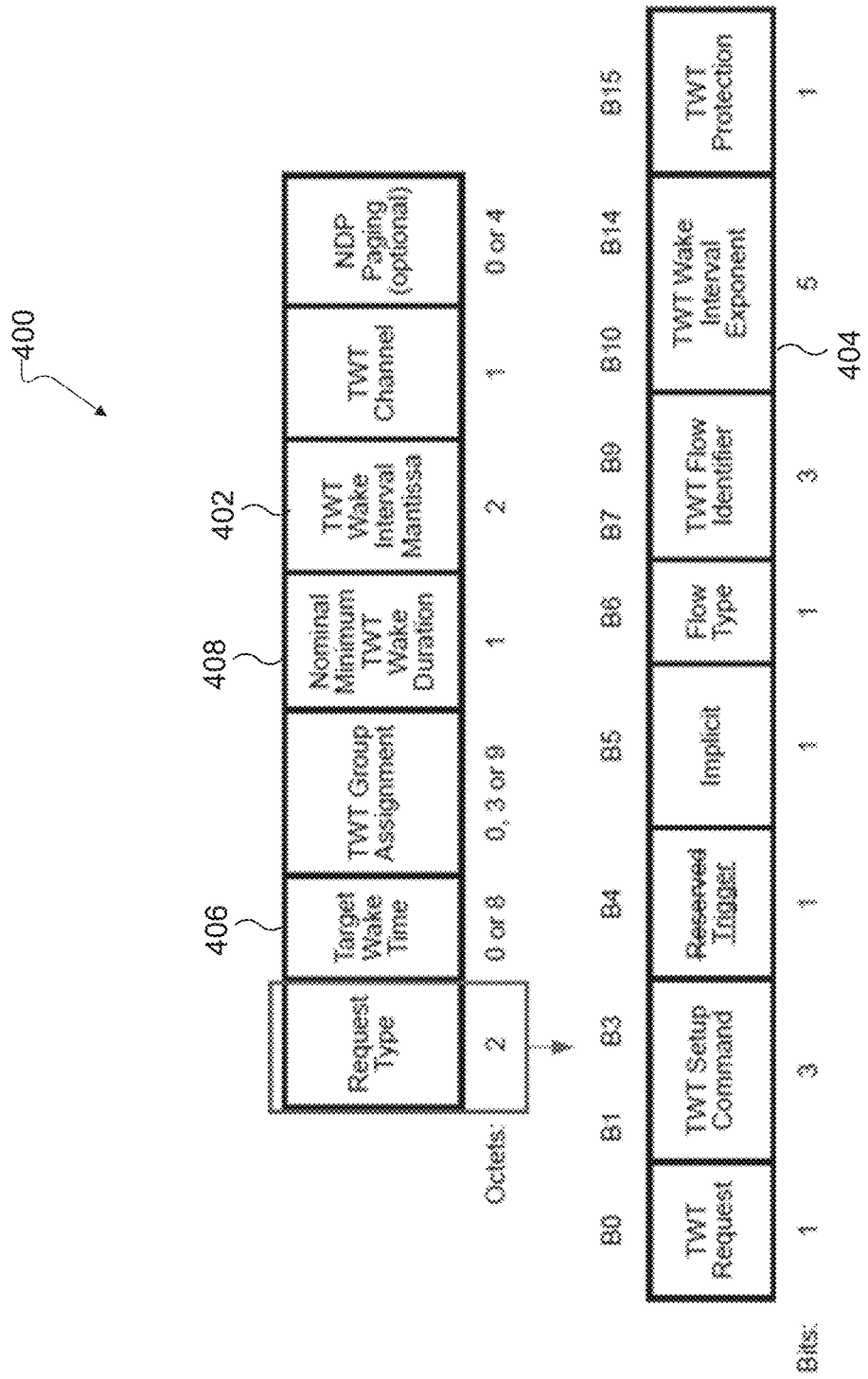
FIG. 4 illustrates an example TWT parameter set field used for TWT parameter negotiation according to embodiments of the present disclosure.

In some embodiments, a TWT parameter set field is used to negotiate the TWT parameters. FIG. 4 illustrates an example TWT parameter set field 400 used for TWT parameter negotiation according to embodiments of the present disclosure. The TWT agreement is initiated by a STA sending a TWT negotiation request to an AP. Once a TWT agreement is made between the AP and the STA, the STA periodically wakes up to communicate with the AP, where the interval between the successive wake times is jointly specified by the TWT wake interval mantissa 402 and TWT wake interval exponent 404 subfields in the TWT parameter set field 400.

The target wake time 406 and nominal minimum TWT wake duration 408 subfields specify, respectively, the first wake time for the TWT agreement, and the time for which the STA must wait before going to doze state when there is no transmitted traffic after a wake time, which is the TWT SP duration 310 in FIG. 3.

Figure 5:
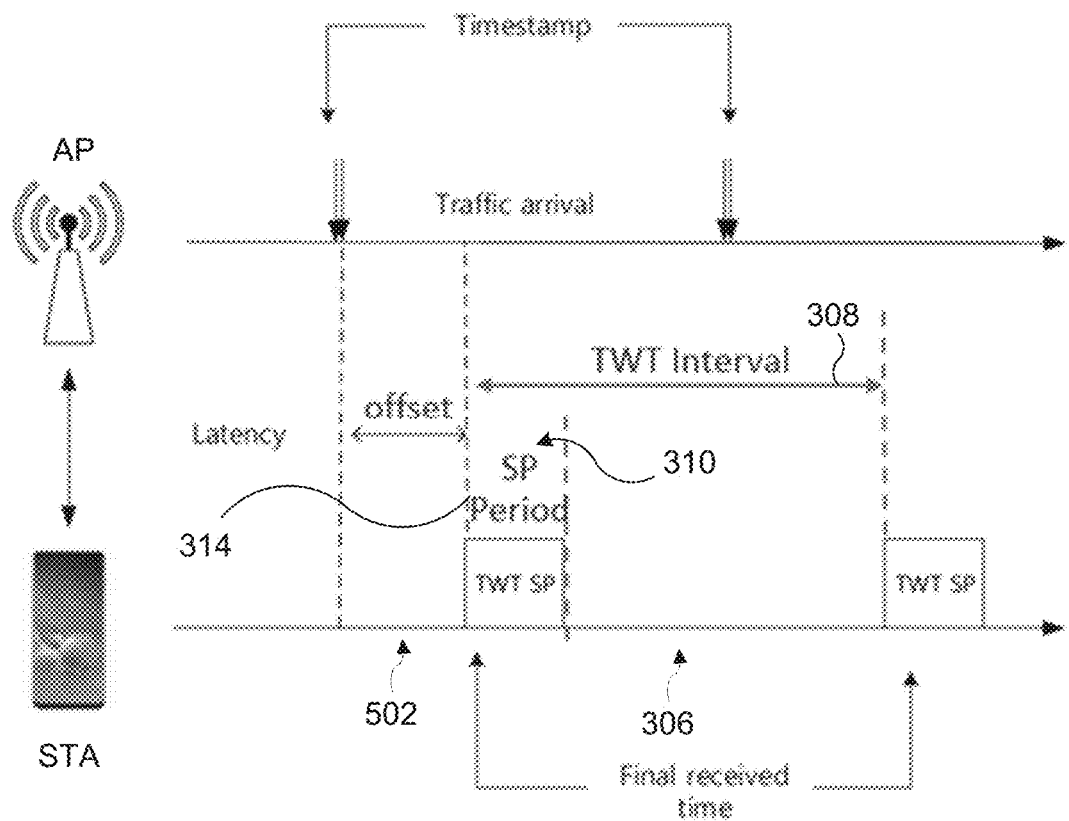
FIG. 5 illustrates an offset in a TWT session according to embodiments of the present disclosure.
Figure 6:
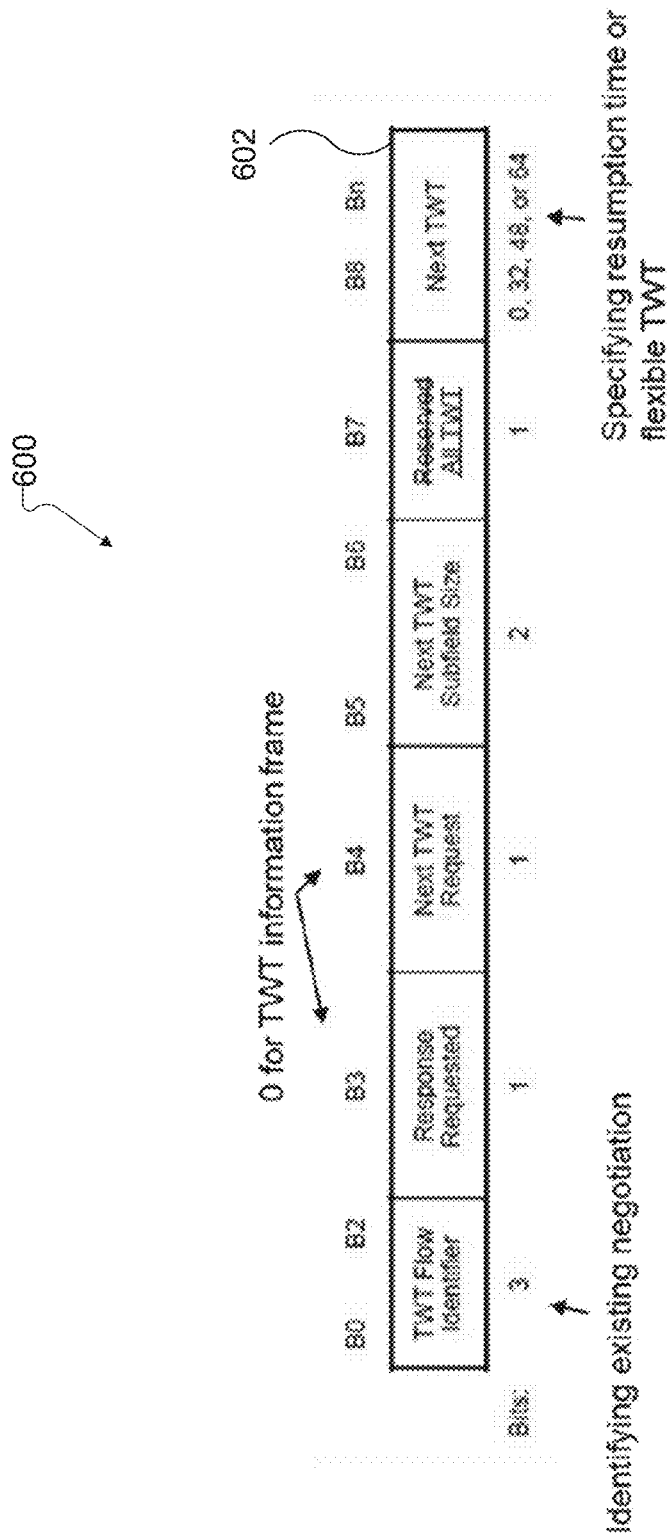
FIG. 6 illustrates an example TWT information frame according to embodiments of the present disclosure.

Other than the wake interval and wake duration, offset is also an important impact factor on the user experience, as the offset could affect the latency. FIG. 5 illustrates an offset in a TWT session according to embodiments of the present disclosure. Different offsets 502 introduce a different additional TWT related latency. TWT interval 308 and offset 502 together define the additional latency introduced by TWT. After TWT negotiation setup, the offset 502 can be adjusted by the field "Next TWT" 602 in the example TWT information frame 600 illustrated in FIG. 6.

Figure 7:
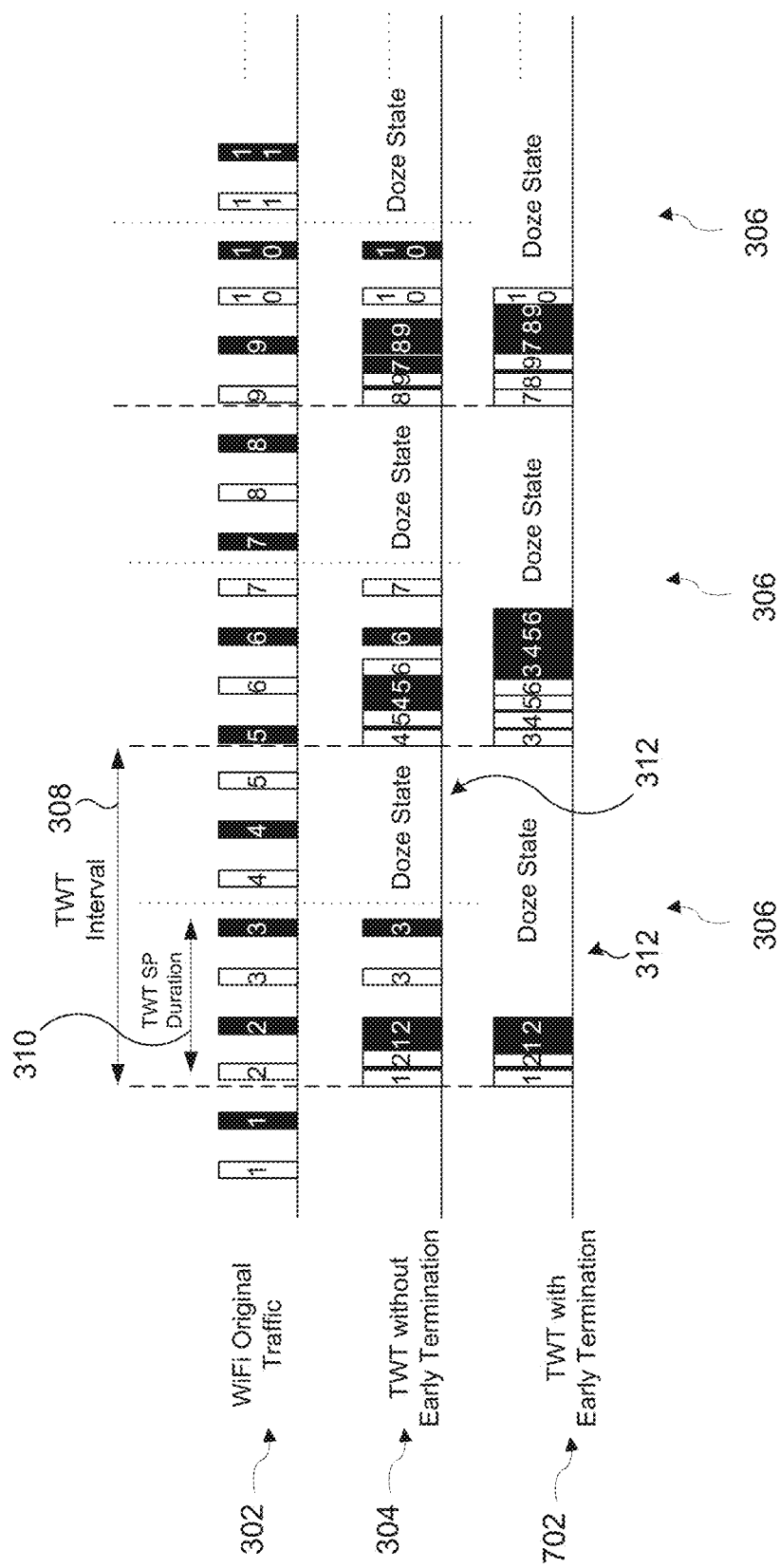
FIG. 7 illustrates an example of early termination of TWT according to embodiments of the present disclosure.

FIG. 7 illustrates an example of early termination of TWT according to embodiments of the present disclosure. In various embodiments, the actual TWT SP duration 310 is dynamically determined in run time by the aforementioned nominal minimum TWT wake duration, and the STA enters the doze state 312 when a packet is received with EOSP (end of service period) bit set to "1", or more data bit set to "0". Depending on whether or not early termination is supported, the time the STA enters the doze state 312 will be slightly different. As shown in the graph 702, if the STA supports early termination then once the STA receives a packet with EOSP bit set to "1" or more data bit "0" the STA can enter doze state 312 (although there could be a slight delay between reception of the packet and entering doze state 312). If the STA does not support early termination, then it will wait until the end of the TWT SP duration 310 to enter doze state 312, as shown in graph 304.

TWT can help save device power by setting a specific STA wakeup interval and the wakeup SP, which can reduce the time and power consumption that the STA is awake but with no data exchange between the AP and the STA. The adjusted TWT parameters, including the TWT wakeup interval and the wakeup SP, need to meet the requirement that the overall throughput of the traffic is not impacted and little or no additional latency is introduced, while achieving a minimal duty cycle.

Though the TWT parameters are adjusted to accommodate the incoming traffic, direct information of the incoming traffic's statistics may not be available, and thus the TWT parameters can only be estimated from the previously observed traffic statistics. Fortunately, many network services show some specific traffic patterns which enables a good estimation of the incoming traffic's statistics based on the past observations.

Figure 8:
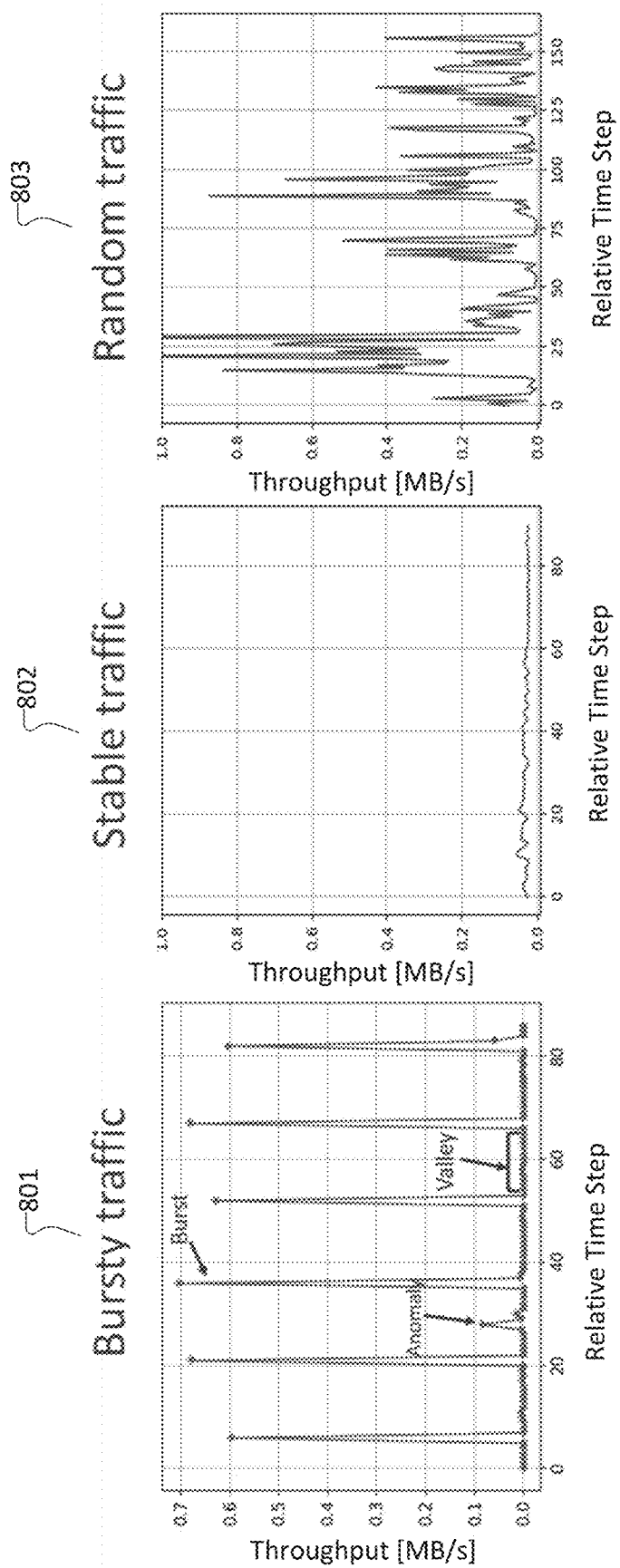
FIG. 8 illustrates a diagram showing example traffic types that can be exhibited by network services according to embodiments of the present disclosure.

FIG. 8 illustrates example traffic types 801-803 that can be exhibited by network services according to embodiments of the present disclosure. As shown in FIG. 8, the network services can exhibit any of three types of traffic types or patterns. These types includes bursty traffic 801, stable traffic 802, and random traffic 803.

The bursty traffic 801 features a periodic "burst" or large throughput, as shown in FIG. 8. When the data in the local buffer is low or empty, the large throughput can be observed to transmit the data to fill the local buffer. After the buffer is filled, relatively low and stable throughput (identified as the "valley" in FIG. 8) can be observed until the local buffer is close to empty for refilling again. The bursty traffic can often be seen in various streaming services such as YOUTUBE LIVE streaming and YOUTUBE video.

The stable traffic 802 features a relative constant throughput with small variations, which can often be observed in some IM calling or teleconferencing applications, such as WHATSAPP audio calling or ZOOM video conferencing.

The random traffic 803 often shows random variations of traffic throughput, which is difficult to predict. The random traffic 803 can be observed in web browsing and other applications in which the user interaction with the smart phone or device is hard to predict.

In order to detect the three traffic types, a real-time traffic type classification method is needed. After determination of the traffic types, the TWT parameter settings can be customized for each traffic type based on their throughput variation pattern. The customized TWT parameter design may prioritize a minimal impact to user experience (e.g., minimal impact on latency or service quality), while saving the most power.

There are a number of design criteria that can be implemented in detecting traffic type. For example, for bursty traffic, it can be important to have a low false detection rate. A reduced TWT duty cycle method can be applied to bursty traffic to trade off buffer filling speed with more aggressive power saving. A reduced TWT duty cycle method can cause QoS issues for other traffic types. Thus, bursty traffic requires a low false detection rate. Stable traffic typically requires relatively low false detection and high accuracy. Only a small margin in the TWT duty cycle is needed. Random traffic typically requires high accuracy and needs to have a large margin for the TWT duty cycle to accommodate sudden random traffic variation.

Another practical issue raised from the traffic type-based TWT parameter design is the observation frequency of the traffic statistics limited by the device. While the TWT parameter design should accommodate the variation of traffic statistics at the scale of a TWT interval (e.g., 20 ms to 80 ms), the traffic statistics often can only be observed at a coarse time scale (e.g., 500 ms), which has averaged out the statistics variation at a small time scale of the TWT interval. Thus, a method is needed to estimate the traffic statistics variation at a fine time scale with the observations from a coarse time scale.

To address these and other issues, this disclosure provides a system and method for traffic type detection and Wi-Fi target wake time parameter design. As described in more detail below, the disclosed embodiments can accurately classify the bursty, stable and random traffic patterns discussed above. The disclosed embodiments can also utilize the information of the traffic pattern to minimize the impact of TWT to user experience while saving the most power. In addition, the disclosed embodiments can estimate fine (small) time-scale traffic statistics based on observations on a coarse (large) time scale.

While the variation of throughput can be the feature to classify the traffic, it is also possible to use the variation of the required minimum TWT wakeup time/service period to support the current throughput as the criteria to classify different traffic types. In the following description, the throughput is used as an example parameter that is used to classify the traffic, but the same method can also be applied to classifying the traffic based on TWT wakeup time/service period.

Figure 9:
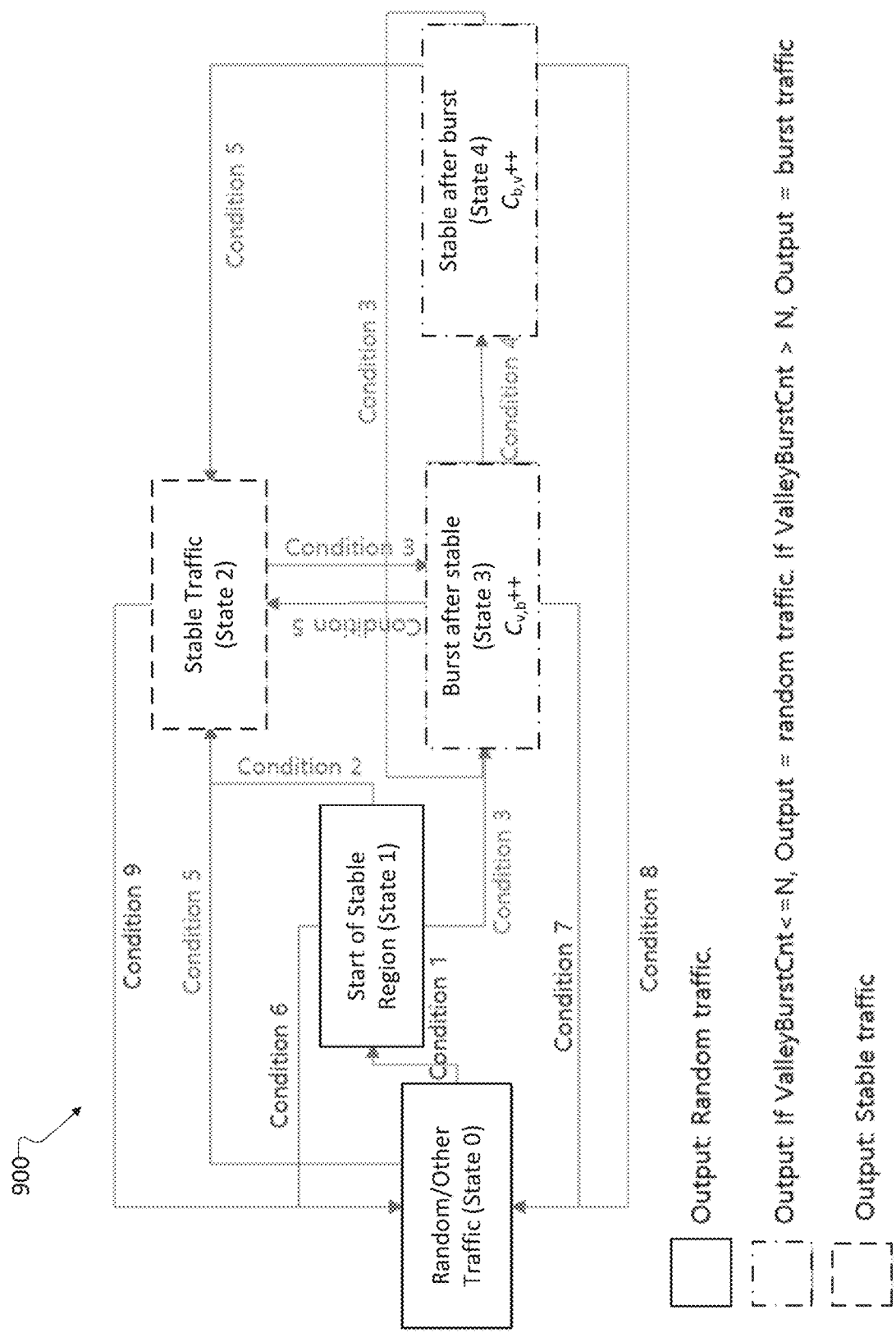
FIG. 9 illustrates details of an example state machine for use in traffic type detection and classification according to embodiments of the present disclosure.

FIG. 9 illustrates details of an example state machine 900 for use in traffic type detection and classification according to embodiments of the present disclosure. The state machine 900 can be used to classify network traffic for a TWT session. For ease of explanation, the state machine 900 will be described as being implemented by a STA, such as one of the STAs 111-114 of FIG. 1. However, the state machine 900 can be implemented by any suitable device. The embodiment of the state machine 900 shown in FIG. 9 is for illustration only. Other embodiments of the state machine 900 could be used without departing from the scope of this disclosure.

As shown in FIG. 9, the state machine 900 includes five internal states (State 0-State 4) and nine conditions (Condition 1-Condition 9) for the transitions among each state.

For State 0 (the initial and default state) and State 1, the output of the state machine 900 (i.e., the classification result) is a random traffic class. For State 2, the output is a stable traffic class. For State 3 and State 4, the output will depend on the value of $C_{v,b}$ and $C_{b,v}$, which represent the number of valley-bursts and burst-valleys, respectively, that have been observed. As shown in FIG. 9, the value of $C_{v,b}$ will increase by 1 if a valley and then a burst is observed. Similarly, the value of $C_{b,v}$ will increase by 1 if a burst and then a valley is observed. The values of $C_{v,b}$ and $C_{b,v}$ are compared to $N_1$ and $N_2$, respectively, which are predetermined threshold values. If the value of $C_{v,b}$ or $C_{b,v}$ is larger than $N_1$ or $N_2$, then the current traffic is classified as bursty traffic. Otherwise, the output of State 3 and State 4 is a random traffic class. In some embodiments, the value of $N_1$ or $N_2$ or both can be increased in order to make the classification criteria of bursty traffic more strict and to make the false detection rate of bursty traffic be further reduced. In the meantime, the detection time required to confirm a bursty traffic can also be increased. A typical value range of $N_1$ or $N_2$ is 0 to 3. In some embodiments, a value of 0 is used for a faster detection of bursty traffic.

Figure 10:
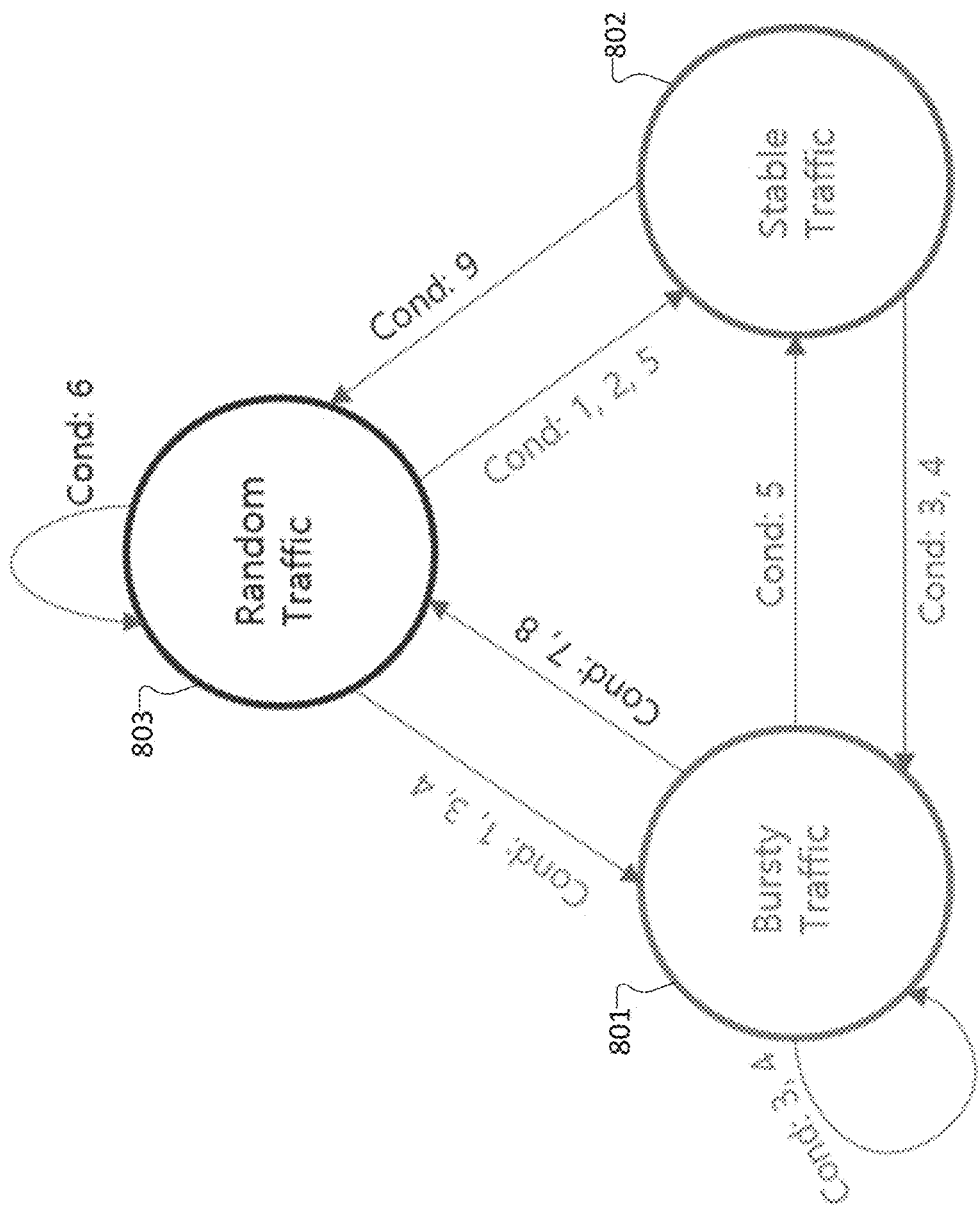
FIG. 10 illustrates example traffic classes and state transition conditions according to embodiments of the present disclosure.

For better understanding of the nine conditions for state transition, the conditions can be arranged into three groups based on the traffic type detection results they may lead to. FIG. 10 illustrates the three traffic classes and the state transition conditions that may lead to each traffic class according to embodiments of the present disclosure. As shown in FIG. 10, the state transition conditions can be grouped as follows:

Bursty Traffic Conditions: Conditions 1, 3, 4.
Stable Traffic Conditions: Conditions 1, 2, 5.
Random Traffic Conditions: Conditions 6, 7, 8, 9

The Bursty traffic conditions are criteria to transition from random or stable traffic to bursty traffic, which will now be discussed.

Condition 1

Condition 1 finds the initial stable part of the traffic characterized by State 1. This initial stable part can either be the beginning of the stable traffic or the valley of the bursty traffic. In essence, Condition 1 indicates whether there are sudden increases in both the instantaneous throughput and the average throughput. If such sudden increases are absent, then it can be inferred that stable traffic may be present. Condition 1 can be expressed as follows:

$|\Delta P_i| \leq Th_1$ (for $i=N-k_1+1, N-k_1+2, \ldots, N$)

AND $|P_N - MA_i^{k_1}(P_i)| \leq Th_2$, where $$MA_i^{k_1}(P_i) = \frac{1}{k_1} \sum_{i=N-k_1+1}^{N} P_i$$

is the moving average of $P_i$ with a window size of $k_1$, $P_N$ is the throughput of the most recent observation, $Th_1$ and $Th_2$ are predetermined threshold values, i represents an observation time point, and N is the latest observation time point.

The value of the moving average window size $k_1$ can be determined empirically offline through observing the typical length of the initial stable valley part of the bursty traffic. A typical value of $k_1$ used for Condition 1 is 5. Typical values of $Th_1$ and $Th_2$ are 0.1 Mbyte/s and 0.12 Mbyte/s. The $P_i$ is the throughput at the ith observation, and $\Delta P_i = P_i - P_{i-1}$ is the change of throughput between each pair of observations.

The first equation in Condition 1 can ensure that variation of the throughput is small between each pair of observations, and the second equation ensures that the throughput remains stable and flat instead of continuing to increase or decrease. If Condition 1 is satisfied, then the state machine 900 transitions from State 0 to State 1. Condition 1 is used to find the initial stable part of the traffic characterized by State 1. If the traffic throughput continues to remain stable, then the state machine 900 would transition to State 2 for stable traffic classification. Otherwise, if a burst is observed, the state machine 900 would transition to State 3 and may lead to the classification as bursty traffic.

Condition 3

Condition 3 is provided to identify the burst part of the bursty traffic. Condition 3 can be expressed as follows:

$\Delta P_i > Th_b$ OR $\Sigma_{i=N-j}^{N} \Delta P_i > w \cdot Th_b$ where $Th_b$ is a predetermined threshold value, w is an empirically determined weighting value, and j represents a number of observation times.

Condition 3 can find the time that a sudden increase of the throughput (denoted by $\Delta P_i$) is larger than $Th_b$. Meanwhile, for bursty traffic, sometimes the throughput might not see a sudden steep jump between two observation times. Thus the condition that the sum of the throughput increases within j observation times being larger than $w \cdot Th_b$ can also be used. In some embodiments, it is determined to set j=2 and w=1.6. A typical value of $Th_b$ is 0.4 Mbyte/s. After entering State 3 (burst after stable state), the next valley of the bursty traffic is determined by testing when Condition 6 will be satisfied. Condition 4 consists of Condition 1 (which ensures a stable traffic pattern) and an additional condition that the moving average of the current valley's throughput must be similar to the moving average of the throughput of the previous valleys of the bursty traffic. This is the based on the fact that the throughput of the valley part of one bursty traffic should remain relatively similar.

Condition 4

Condition 4 is provided to identify the valley part after a burst in the bursty traffic. Condition 4 can be expressed as follows:

Condition 1 AND $|MA_i^{k_1}(P_i) - MA_j^{k_v}(P_{v,j})| \leq Th_v$ where $P_{v,j}$ is the mean throughput of the jth previous valley within the current bursty traffic, $k_v$ is the number of previous valleys used to compute the moving average of the valleys' throughput, and $Th_v$ is a predetermined threshold. A typical value of $k_v$ is 5. A typical value of $Th_v$ is 0.12 Mbyte/s.

Condition 4 ensures that the mean throughput of the current valley is close to the moving average of the mean throughput of the previous valleys. After entering State 4 with Condition 4, the STA has already identified a stable (valley), burst, stable (valley) pattern of the traffic which indicates that the current traffic is highly likely to satisfy the bursty traffic pattern. In some embodiments, a counter $C_{V,B}$ can be used to record the number of times that State 4 is continuously reached from State 3, which represents the number of times that the valley-burst-valley traffic pattern is observed. If $C_{V,B} > N$, then the traffic can be classified as bursty traffic. In some embodiments, it is determined to set N=0, however N can also be set to a larger number to further reduce the false detection rate of bursty traffic type.

The Stable Traffic Conditions are criteria to transition from random or bursty traffic to stable traffic, which will now be discussed.

Condition 2

Condition 2 is provided to confirm that a stable traffic is present after the initial stable part of the traffic is detected in State 1. Condition 2 can be expressed as follows:

$|\Delta P_i| \leq Th_3$ (for $i = N-k_2+1, N-k_2+2, \ldots N$)

AND $|P_N - MA_i^{k2}(P_i)| \leq Th_4$, where $Th_3$ and $Th_4$ are predetermined threshold values.

Condition 2 is similar to Condition 1 with the difference on the throughput variation threshold being set to $Th_3$ and $Th_4$, which are usually larger than $Th_1$ and $Th_2$. This is due to the fact that the throughput variation of the stable traffic, such as video conferencing, is often larger than the throughput variation of the valley part of bursty traffic. Typical values of $Th_3$ and $Th_4$ are 0.2 Mbyte/s and 0.25 Mbyte/s, respectively. The variable $k_2$ represents the number of additional observations needed to confirm a stable traffic after observing the initial stable part of the traffic with State 1. In some embodiments, the value of $k_2$ is set to 9.

Condition 5

Condition 5 is provided to directly confirm the presence of a stable traffic from the random traffic state. Condition 5 shares the same form as Condition 2 with the only difference in the number of consecutive observations ($k_3$ instead of $k_2$) needed to directly confirm a stable traffic without detecting the initial stable part of the traffic. A typical value of $k_3$ is 14 which can be the sum of $k_1$ and $k_2$.

The Random Traffic Conditions are criteria to transition from bursty or stable traffic to random traffic, which includes Conditions 6, 7, 8, and 9, as discussed below.

Condition 6

Condition 6 can be stated as follows: In State 1, when Condition 1 is NOT satisfied, then transition to State 0. Condition 6 is used to check whether the traffic pattern sees a large variation and is no longer stable, which indicates that the traffic becomes random.

Condition 7

Condition 7 is provided to identify that the traffic has lost the pattern of a bursty traffic and becomes random in State 3. Condition 7 can be expressed as follows:

$T_{bur} \geq MA_i^{k4}(T_{val,i})$

The value $T_{bur}$ is the time duration of the current burst in State 3, and $MA_i^{k4}(T_{val}, i)$ is the moving average of the time duration of the valley part of the current bursty traffic. Condition 7 is based on the fact that the time duration of the valley is always statistically longer than the duration of the burst.

Condition 8

Condition 8 is provided to identify that the traffic has lost the pattern of a bursty traffic and becomes random in State 4. In State 4, when Condition 1 is NOT satisfied for $N_1$ consecutive observations or $N_2$ observations within a $N_3$ long observation window, then the STA transitions to State 0. Typical values of $N_1$, $N_2$, and $N_3$ are 2, 2, and 10, respectively. Condition 8 is very similar to Condition 6 but with added tolerance to allow some anomalies in the valley part of bursty traffic (such as the anomaly shown in the bursty traffic 801 in FIG. 8). The tolerance is added based on the conditional probability that, when State 4 is reached, the traffic is likely to be bursty traffic and some abnormal pattern at the valley part is then tolerable.

Condition 9 is similar to the criteria in Condition 8. The only difference is that "when Condition 1 is NOT satisfied" is changed to "when Condition 2 is NOT satisfied".

Figure 11:
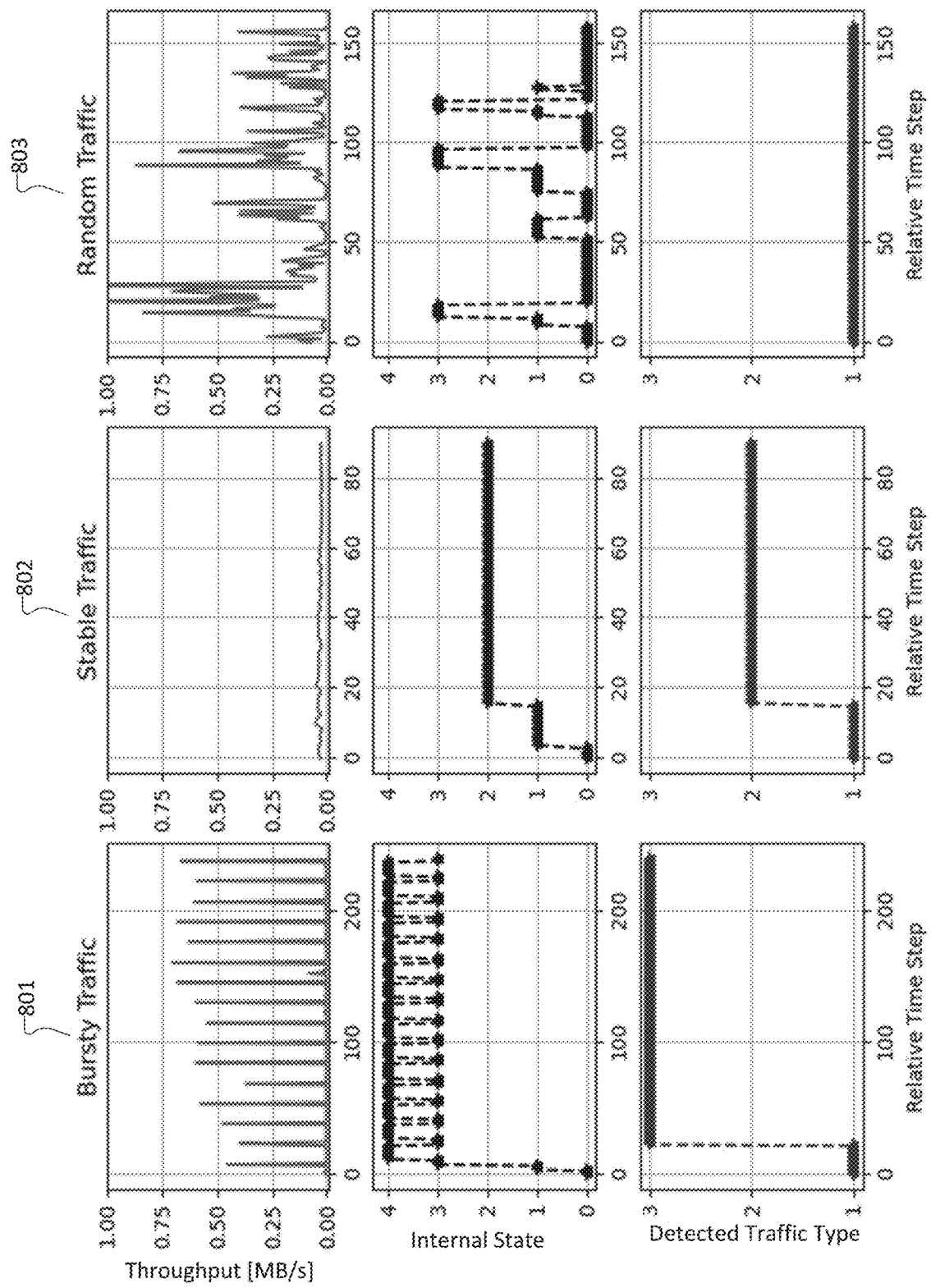
FIG. 11 illustrates example results from the traffic type detection technique described in FIGS. 9 and 10 according to embodiments of the present disclosure.

FIG. 11 illustrates example results from the traffic type detection technique discussed in FIGS. 9 and 10 according to embodiments of the present disclosure. As shown in FIG. 11, three applications (e.g., YOUTUBE video, WEBEX video conference, and web browsing), which correspond to bursty traffic 801, stable traffic 802, and random traffic 803, respectively, are used. The first row of FIG. 11 depicts the traffic pattern, i.e., the throughput over time, for each application. The second row of FIG. 11 shows how the internal state of the state machine 900 transitions when detecting different traffic patterns. The third row of FIG. 11 shows the final traffic type classification result of the state machine 900 (e.g., 1=random, 2=stable, 3=bursty). As shown in FIG. 11, for the bursty traffic 801, the internal state of the state machine 900 will first transition to State 1 when it detects the first valley of the bursty traffic 801. Then the state machine 900 will transition to State 3 when the burst part of the bursty traffic 801 is observed. Then the state machine 900 will transition to State 4 after observing another valley of the bursty traffic 801. At this stage, the value $C_{v,b}$ is equal to 1, and the current traffic is classified as bursty traffic.

It can also be seen in FIG. 11 that there is one anomaly in the valley part of the bursty traffic 801, whose throughput is obviously higher than the valley, but is also significantly lower than the burst. As the transition condition in State 4 allows such an anomaly, the state machine 900 does not immediately transition to State 0 and classify it as random traffic.

For the stable traffic 802 in FIG. 11, it can be seen that the state machine 900 first finds the initial stable region (State 1), and then transitions to State 2 after the state machine 900 continues to observe that the traffic is stable without burst or anomalies. Then the traffic is classified as stable. For the random traffic 803 of web browsing in FIG. 11, the state machine 900 is not able to find a sufficiently long stable region or identify a pattern of bursty traffic. Thus, the classification result is considered to be random.

Figure 12:
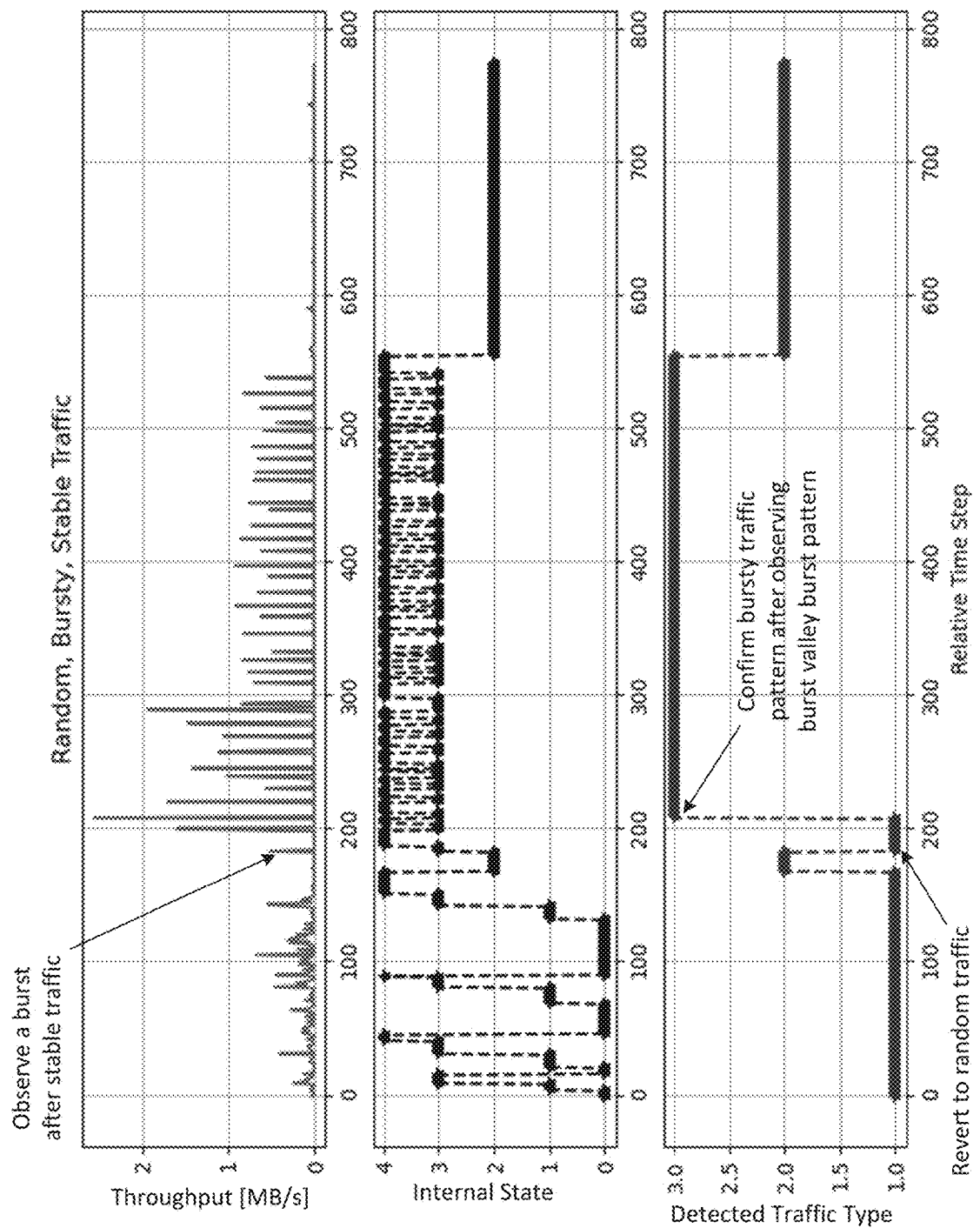
FIG. 12 illustrates an example of the state machine of FIG. 9 transitioning among three traffic types according to embodiments of the present disclosure.

FIG. 12 illustrates an example of the state machine 900 transitioning among the three traffic types according to embodiments of the present disclosure. As shown in FIG. 12, a test is performed by first performing web browsing (random traffic), then playing a YOUTUBE LIVE video (bursty traffic). After that, the test performs PANDORA audio streaming, which can produce stable traffic. As shown in FIG. 12, after finishing the web browsing and before starting the YOUTUBE LIVE video, the state machine 900 observes a period of time that the throughput is stable. The state machine 900 switches to the internal State 2 and classifies the traffic as stable. As the YOUTUBE LIVE video starts, a burst is observed, which breaks the stable traffic condition, and the state machine 900 immediately switches to the random traffic type. Then, after observing the valley-burst pattern, the state machine 900 classifies the traffic as bursty. After the YOUTUBE LIVE video is stopped and the PANDORA audio stream starts, the state machine 900 observes a continuously stable throughput, and classifies the traffic as stable.

In addition to detecting the three traffic types, the state machine 900 can also find the length of the valley and burst of the bursty traffic, which can be useful for the customized TWT polling cycle design. After detecting the bursty traffic, a moving average window is used to compute the current mean value of the burst and valley length in units of observation time steps.

The moving average of the burst length $T_{bur}^{MA}$ can be expressed as:

$$T_{bur}^{MA} = MA_i^k(T_{bur,i})$$

The moving average of the valley length $T_{val}^{MA}$ can be expressed as:

$$T_{val}^{MA} = MA_i^k(T_{val,i})$$

In these equations, the value k is the size of the moving average window. The moving average value of $T_{bur}$ and $T_{val}$ calculated above can be used to determine the polling cycle $T_{cc}$, which will be discussed in detail below.

Traffic Type Based TWT Parameter Design

In this section, the TWT parameter design based on the detected traffic types is described. In some embodiments, the TWT SP duration 310 is designed to adapt to a stable stream of traffic and accommodate quickly to a burst stream of traffic solely on the means of incoming throughput transformed in to time. The transformation in time is achieved by initially clustering the packets into buffered packets (received/transmitted after a period of time) and non-buffered packets (received/transmitted as soon as arrived/created at node). Then a combination of statistics from all packets (e.g., packet size, inter packet arrival time, number of buffered packets, number of non-buffered packets, and the like) is used to analyze the time required to accommodate future traffic.

Using these criteria, the TWT SP duration 310 is updated based on a stable condition and an overflow condition. One example of this functionality is described in U.S. patent application Ser. No. 17/444,981, which is hereby incorporated by reference in its entirety.

In a stable condition, the TWT SP duration 310 is updated based on long-range statistics for stable traffic stream. A stable update happens when the traffic is mostly even and does not deviate substantially from the past trends in the observation window. This can be thought of as a Max envelope tracker of the past traffic. In some embodiments, the TWT SP duration 310 is updated as a sum of the $T_{max}$ and a stable update guard. A stable update guard is used to accommodate for any errors in the data time estimation or variance in the incoming data. In addition, if there is an increase in the number of packets, the stable update guard provides enough room to accommodate for that.

In an overflow condition, the TWT SP duration 310 is updated based on instantaneous traffic burst statistics to immediately ramp up the TWT SP duration 310. Overflow protection allows scaling of the TWT SP duration 310 quickly in the case of large incoming data, and prevents the link from saturating below its capability due to TWT. This protection is integral for applications like web browsing, video streaming, and the like, where data comes in the form of periodic and aperiodic bursts and other times there is no traffic present. As the stable update happens at a slower rate, overflow protection can be used to increment the TWT SP duration 310 faster to adapt to the incoming large traffic.

Figure 13A:
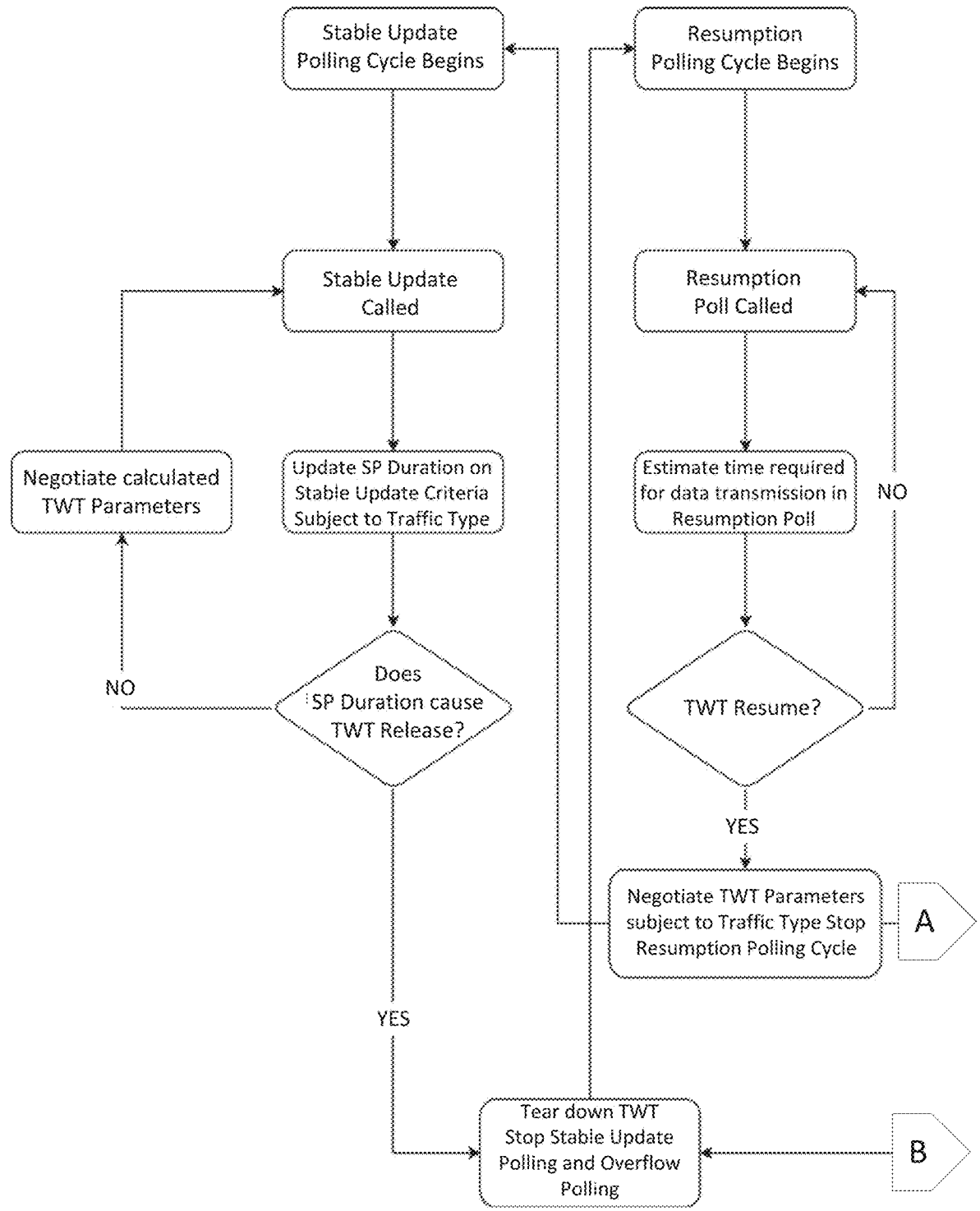
FIGS. 13A and 13B illustrate an example of a technique for releasing and resuming TWT according to embodiments of the present disclosure.
Figure 13B:
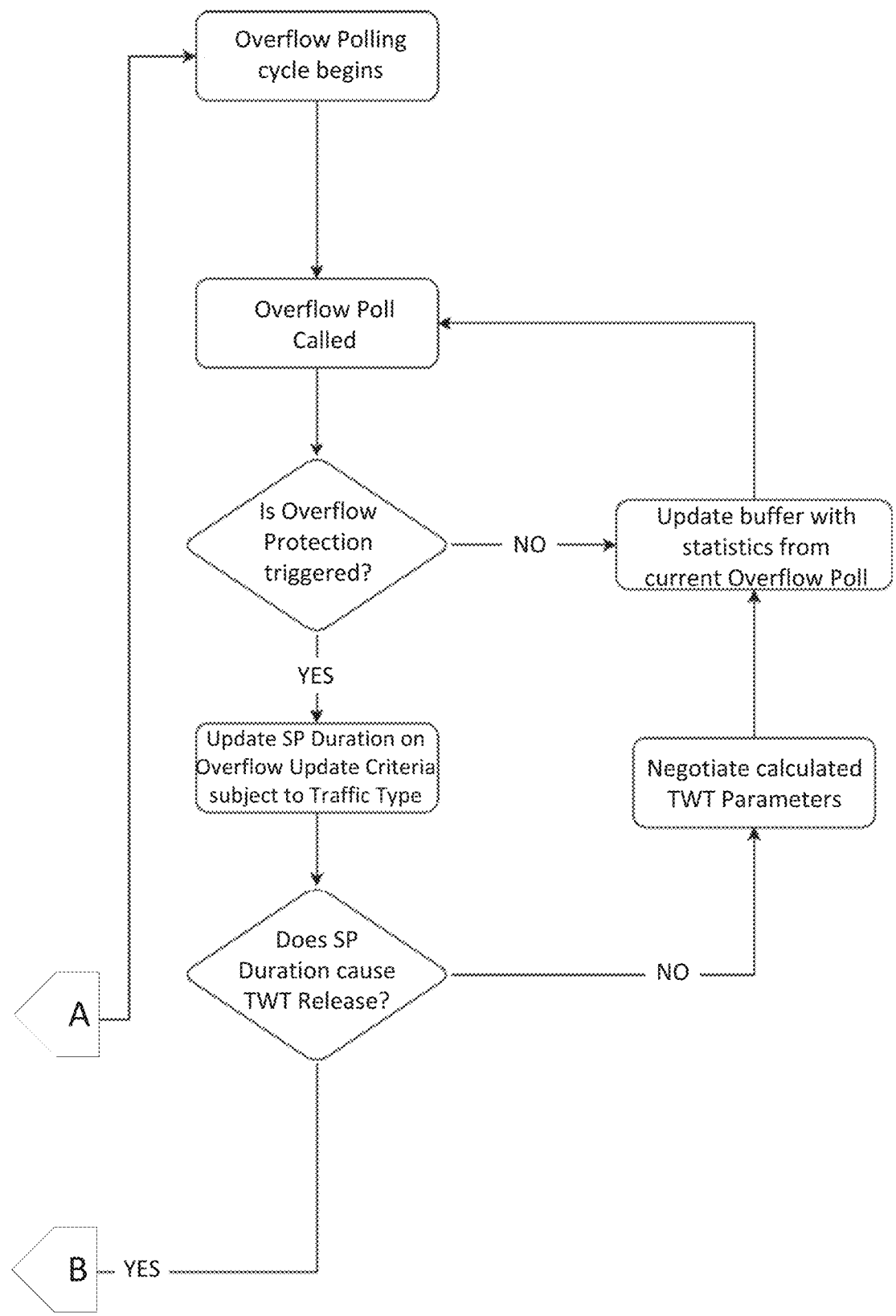

In this document, using the output from the state machine 900, the update conditions are adapted for random, stable, and burst traffic. A technique for how to release and resume TWT is also provided. FIGS. 13A and 13B illustrate one example of the adapted technique according to embodiments of the present disclosure.

Stable Update Polling Cycle

The stable update polling cycle $T_{cc}$, is the polling interval defined to adapt the duration based on the long-term observed statistics of the traffic flow and network conditions of the STA. The intuition is to keep $T_{cc}$, long enough to prevent frequent negotiations in the case of stable traffic and to reduce the time the duration stays large to accommodate for a burst or random traffic input.

In some embodiments, when the detected traffic is of stable type, $T_{cc}$, is set to the time required to capture the effective long-term statistics based on the variance of the traffic flow, amount of traffic within $T_{cc}$, etc. In another embodiment, $T_{cc}$, can be set to an estimated value defined by data-driven analysis of different stable traffic flows, an exemplary value of which can be six seconds.

In some embodiments, when the detected traffic is of bursty type, $T_{cc}$ is set to a short duration, to revert to a lower TWT SP duration 310 when the burst communication has finished by setting $T_{cc}$ using a function of burst duration $T_{bur}$ and valley duration $T_{val}$ as calculated by the state machine 900. In this case, the update of $T_{cc}$ can be expressed as the following function:

$$T_{cc} = f(T_{bur}, T_{val}).$$

One example of this function can be:

$$T_{cc} = T_{bur} + 0.25 * T_{val}.$$

In some embodiments, the polling cycle $T_{cc}$ can be set to an estimated value defined by data-driven analysis of different bursty traffic flows, an exemplary value of which can be two seconds.

For random traffic, in some embodiments, $T_{cc}$ can be set to an estimated value defined by data-driven analysis of different random traffic flows, an exemplary value of which can be three seconds.

Data Time Estimation

To compute the required TWT service period $T_{wd}$, an estimated data time $T_{dt}$ can be used. The data time $T_{dt}$ can be calculated based on a combination of the amount of data communicated and the network conditions. For example, the data time $T_{dt}$ can be estimated according to the following model:

$$T_{dt} = \left(\frac{B_{tx}}{S_{tx}} + \frac{B_{rx}}{S_{rx}}\right) \cdot \left(\frac{\alpha}{1 - \frac{T_{cca}}{T_{on}}} + 1 - \alpha\right)$$

$$= T_{data} \cdot \left(\frac{\alpha}{1 - \frac{T_{cca}}{T_{on}}} + 1 - \alpha\right)$$

where $B_{tx}$, and $B_{rx}$ are the amounts of data transmitted and received, respectively, $T_{cca}$ is the channel clearance assessment time, $T_{on}$ is the radio on time, $S_{tx}$ and $S_{rx}$ are the link speed for transmitting and receiving, respectively, and a is a hyper parameter which can be determined empirically. An exemplary value of a is 1.9.

Overflow Update

A special case of overflow update is the bursty traffic type. In this case, the bursts are short intervals of traffic that arrive pseudo-periodically with long intervals of silence interleaved between the bursts. The overflow update for the bursty traffic type can be customized by reducing the amount by which $T_{wd}$ is updated. On encountering an overflow trigger during the bursty traffic type, the update formula is as follows:

$$T_{wd,i+1} = T_{wd,i} + \delta_{OF}$$

where i is the index of the ith TWT SP and $\delta_{OF}$ is an overflow update guard. As can be seen here, instead of updating on the $T_{dt,max}$, the STA updates on the previous $T_{wd}$. This reduces the amount by which the $T_{wd}$ scales. As bursty traffic is usually observed in non-real-time traffic with no latency requirement, this customization saves power by scaling smaller than the regular overflow update.

An overflow threshold $\rho_{OF}$ is kept as 0.2 in the case of random traffic because the traffic type is non-deterministic and permits faster adaptation. Additional cases which require quick ramping up are network speed testing and file downloading, in which case $T_{wd}$ needs to be increased as much as possible because the throughput is higher for these requirement applications. In the case of deterministic traffic like stable or burst, $\rho_{OF}$ is kept as 0.1. This reduces the probability of unnecessary overflows occurring and wasting power.

Stable Update

As noted here, for stable traffic and the stable guard $\delta_{stable}$, the standard deviation of the traffic data time in a stable update polling cycle $T_{dt,std}$ is used instead of 10% of the $T_{inv}$. This is because in stable traffic, the STA just accommodates for the variation in traffic which is deterministic.

Example values of the parameters used for determining the TWT SP duration 310 based on traffic type and exemplary values are summarized in Table 1. Of course, these values represent only one example. Other values are possible and within the scope of this disclosure.

TABLE 1

Traffic type based TWT parameter design

| Parameters | Traffic Type | | |
|---|---|---|---|
| | Random | Stable | Burst |
| Overflow Threshold Percentage, $\rho_{OF}$ | 0.2 | 0.1 | 0.1 |
| Overflow Threshold, $T_{OF}$ | max($\rho_{OF}$ * $T_{wd}$, 1500 ms) | | |
| Overflow Update Guard, $\delta_{OF}$ | 0.2 * $T_{inv}$ | | |
| Overflow Update | $T_{dt,\,max} + \delta_{OF}$ | $T_{dt,\,max} + \delta_{OF}$ | $T_{wd} + \delta_{OF}$ |
| Stable Update Guard, $\delta_{stable}$ | max(0.1 * $T_{inv}$, ϵ) | max($T_{dt,\,std}$, ϵ) | max(0.1 * $T_{inv}$, ϵ) |
| Stable Update | | $T_{dt,\,max} + \delta_{stable}$ | |
| Boost Multiplier, $m_{boost}$ | 3.5 | 2 | 1 |
| Boost Offset, $c_{boost}$ | 400 | 400 | 1500 |

TWT Release and Resumption

The main purpose of TWT is to save power in the STA by scheduling the time the STA stays awake. At higher duty cycles (where the duty cycle is the ratio of SP Duration $T_{wd}$ to TWT Interval $T_{inv}$, or $$\frac{T_{wd}}{T_{inv}} \Big),$$

the power gain is minimal compared to disabling TWT. In such scenarios, it is more convenient to disable TWT, which is referred to herein as TWT release.

After TWT release, traffic flow and network conditions are still monitored to identify if it is convenient to enable TWT, which is referred to herein as TWT resumption.

For TWT release, there are two criteria to consider:

$$T_{inv} - T_{wd} < T_{overhead}$$

$$\frac{T_{wd}}{T_{inv}} < D_{max}$$

where $T_{overhead}$ is the overhead time associated with the TWT associated signaling between the STA and AP, and $D_{max}$ is the maximum duty cycle beyond which power saving capability of TWT is minimal compared to having no TWT set up. $D_{max}$ is estimated by studying the power consumption of traffic at different duty cycles and without TWT and studying the power consumption by the Wi-Fi chipset. If any of these above conditions is satisfied, the existing TWT setup is torn down between the AP and the STA. After this, the STA disables the overflow and stable polling cycles and then starts the resumption polling cycle.

At every resumption poll, the traffic flow and the network conditions are observed to evaluate if the conditions are right to resume TWT. The observed conditions are:

$$\frac{T_{dt}}{T_{obs}} < D_{hysteresis}$$

where $T_{obs}$ is the observation time in which the data time $T_{dt}$ is calculated and the observation time is set to the resumption poll period, and $D_{hysteresis}$ is the hysteresis duty cycle which is set to discourage frequent TWT resumption and release in case the traffic fluctuates below $D_{max}$.

Estimating Fine-Time Scale Network Statistics from Coarse-Time Scale Observation The following section describes an example technique for estimating the fine-time scale network statistics from a coarse-time scale observation. To calculate the proper TWT parameters, it is advantageous to have a good estimation of the network statistics and convert them to the required time or duty cycle to transmit the current traffic between the STA and the AP. However, due to the device hardware limits, it can be difficult to frequently observe the statistics of the traffic. The observation time is usually on a time scale of every $S_c$ time unit, where a typical value of $S_c$ is 500 ms. In contrast, the TWT parameters accommodate the statistical variation of the traffic at a much finer time scale $S_f$, where a typical value of $S_f$ is 25 ms.

Figure 14:
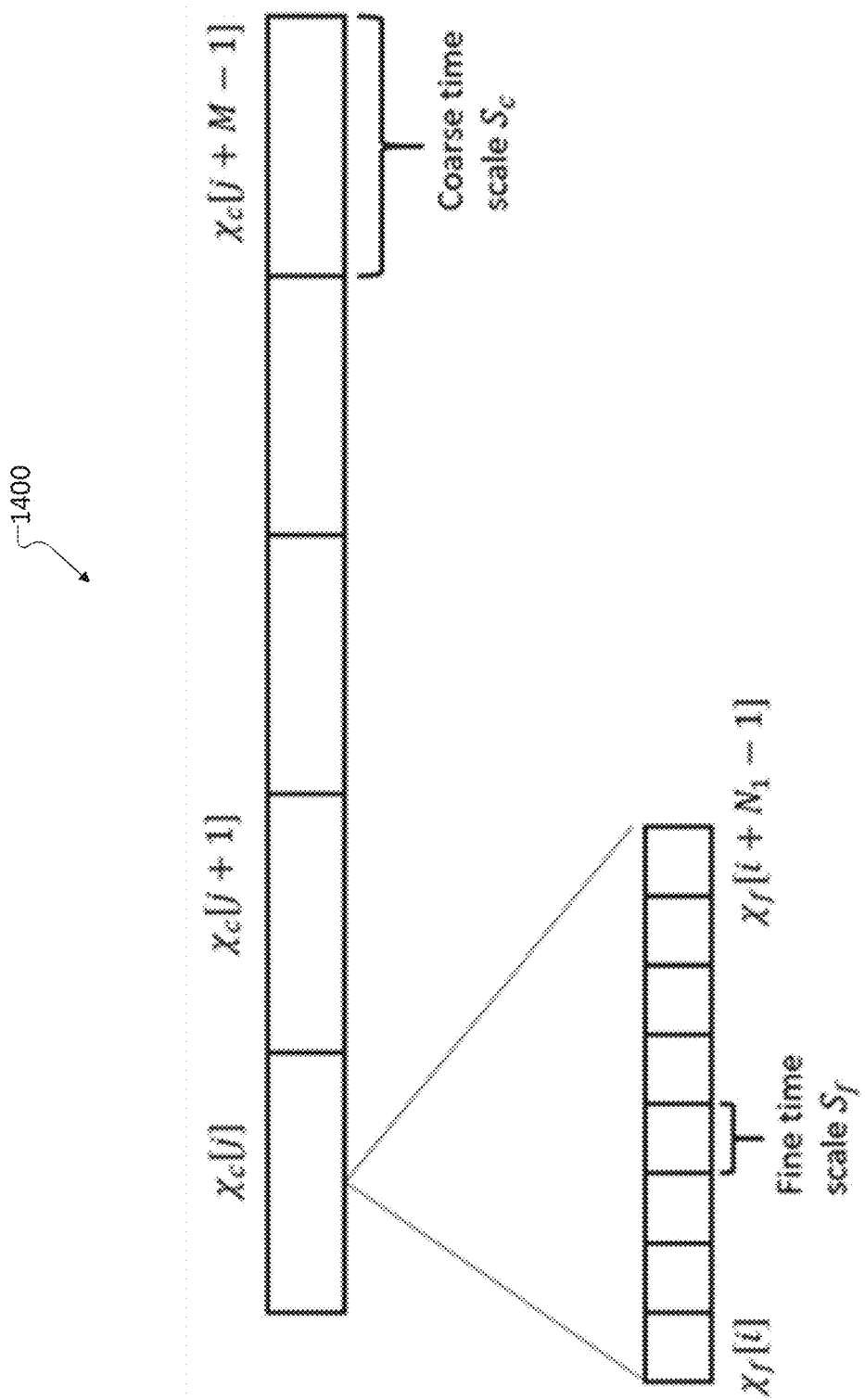
FIG. 14 illustrates a diagram showing an example of fine and coarse time-scale for traffic statistics observation according to embodiments of the present disclosure.

FIG. 14 illustrates a diagram 1400 showing an example of fine and coarse time-scale for traffic statistics observation according to embodiments of the present disclosure. As is shown in FIG. 14, the network statistics X can be observed on a fine time scale $S_f$ or on a coarse time scale $S_c$, which can give the observation results as $X_f$ or $X_c$. The network statistics X can be, e.g., traffic throughput, total amount of transceived data B, total number of transceived packets, link speed, CCA time, radio-on time, estimated minimum data transceiving time $T_{dt}$ for the TWT operations in order to accommodate the current throughput at the current network condition, and the like.

Figure 15:
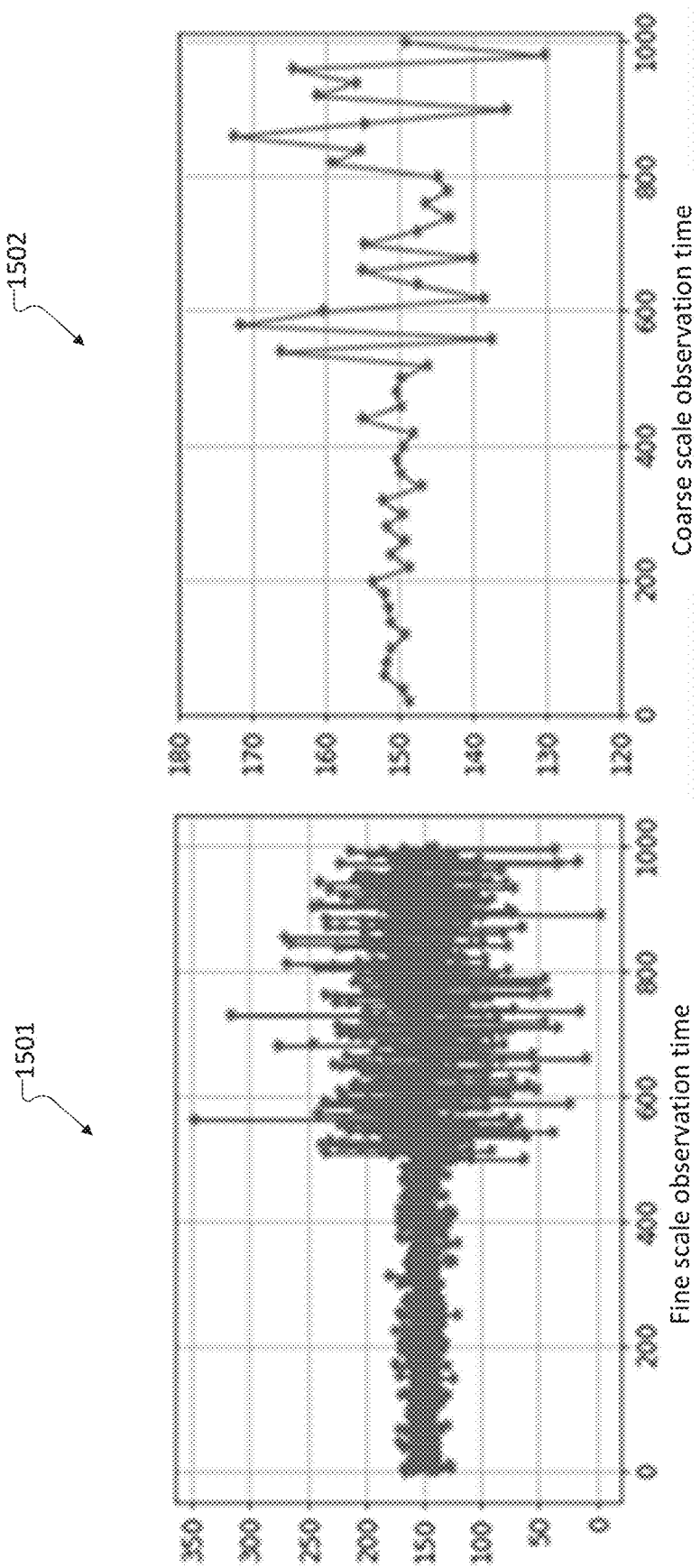
FIG. 15 illustrates example charts showing the same traffic statistics of packet number observed in fine time scale and coarse time scale, according to embodiments of the present disclosure.

FIG. 15 illustrates example charts 1501-1502 showing the same traffic statistics of packet number observed in fine time scale and coarse time scale, according to embodiments of the present disclosure. As shown in FIG. 15, the variation of the packet number in every fine time-scale observation time slot (as shown in the chart 1501) is much larger than the variation of the packet number in every coarse time-scale observation time slot (as shown in the chart 1502).

Figure 16:
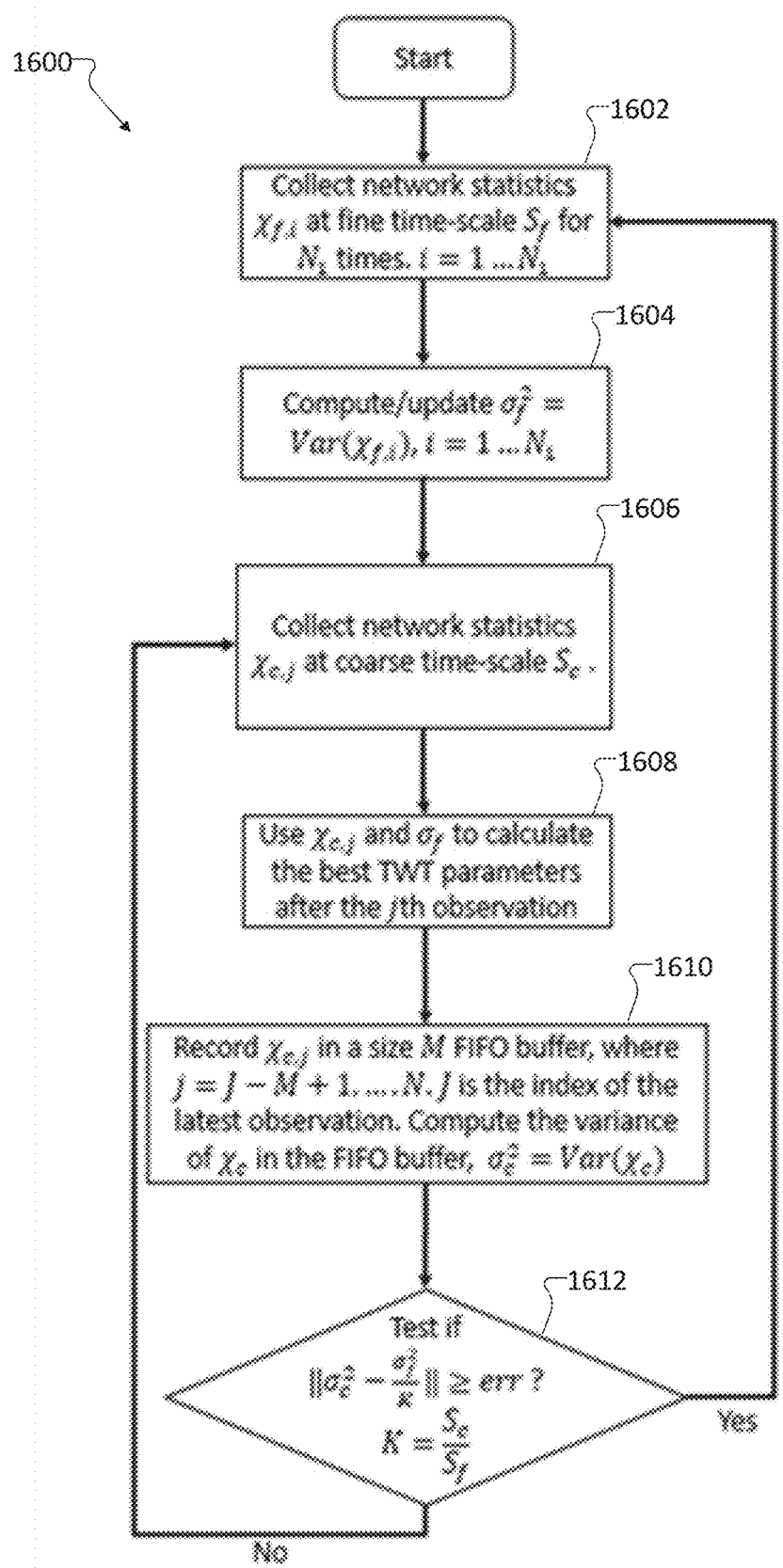
FIG. 16 illustrates an example process for dynamically updating network statistics variation according to embodiments of the present disclosure.

FIG. 16 illustrates an example process 1600 for dynamically updating network statistics variation according to embodiments of the present disclosure, as may be performed by a STA (e.g., one of the STAs 111-114 as illustrated in FIG. 1). The embodiment of the process 1600 shown in FIG. 16 is for illustration only. Other embodiments of the process 1600 could be used without departing from the scope of this disclosure.

In the process 1600, the STA only collects the variance of the network statistics at a fine time scale when it is necessary. The variance of the fine time scale network statistics are dynamically updated only when it is determined, based on the coarse time-scale observations, that the variance of network statistics have a large change.

To better explain the relationship between $\chi_f$ and $\chi_c$, in the process 1600, network statistics of the total amount of transceived data $B^{25}$ of every 25 ms can be used as an example. At step 1602, network statistics $X_f$ are collected at the fine time scale $S_f$. If the fine time scale observation of B is performed every 25 ms, then this can be expressed as:

$$B^{25} = \chi_f^{25}.$$

At step 1604, the variation of $B^{25}$ from the fine time scale observation is computed as:

$$\text{var}(\chi_f^{25}) = \sigma_f^2.$$

At step 1606, network statistics $\chi_c$ are collected at the coarse time scale $S_c$. If the coarse time scale observation of B is performed every 500 ms, then the estimated $\hat{B}^{25}$ can be expressed as:

$$\hat{B}^{25} = \chi_c^{25} = \frac{B^{500}}{N_1} = \frac{1}{N_1}\sum_{i=1}^{N_1} \chi_f^{25}[i],$$

where $N_1 = 50$.

As can be seen above, the coarse time scale observation result $\chi_c^{25}$ can be viewed as the statistical mean of the $\chi_f^{25}$. In the meantime, the variance of the coarse time-scale observation $\text{var}(\chi_c^{25}) = \sigma_c^2$ can be obtained. If the network statistics remain unchanged, then the following relationship applies:

$$\sigma_c^2 = \text{var}(\chi_c^{25})$$
$$= \text{var}\left[\frac{1}{N_1}\sum_{i=1}^{N_1}\chi_f^{25}[i]\right]$$
$$= \frac{1}{N_1^2}\sum_{i=1}^{N_1}\text{var}(\chi_f^{25})$$
$$= \frac{1}{N_1^2}N_1\sigma_f^2$$
$$= \frac{1}{N_1}\sigma_f^2.$$

Thus, if the statistical variation at the fine time scale is not changed, then the following relationship applies:

$$\sigma_c^2 = \frac{1}{N_1}\sigma_f^2.$$

At step 1608, the difference of $\sigma_c^2$ and $\sigma_f^2$ is tested to see how much the variation of the statistics have changed. While there is no significant change of the variation of the statistics, the currently observed coarse time scale statistics $X_c$ and the previously acquired fine time scale statistics variation $\sigma_f^2$ can be used to estimate the needed TWT parameters.

At step 1610, the coarse time scale variation $\sigma_c^2$ can be acquired by accumulating $\chi_c$ in a size M FIFO buffer and calculating its variance. If the coarse time scale observation interval $S_c$ and the fine time scale observation interval $S_f$ has a relationship $S_c = K \cdot S_f$, then the coarse time scale observed statistics' variation $\sigma_c^2$ can have the relationship of:

$$\sigma_c^2 = \frac{1}{K}\sigma_f^2.$$

At step 1612, it is tested if $$\left\|\sigma_c^2 - \frac{\sigma_f^2}{K}\right\| \geq err$$

to determine whether the statistical variation at the small time scale has changed. A typical value of err can be $0.05\sigma_c^2$. If the test result is true, then a fine time scale sampling or observation is needed again to update $\sigma_f^2$, and the process 1600 returns to step 1602.

Figure 17:
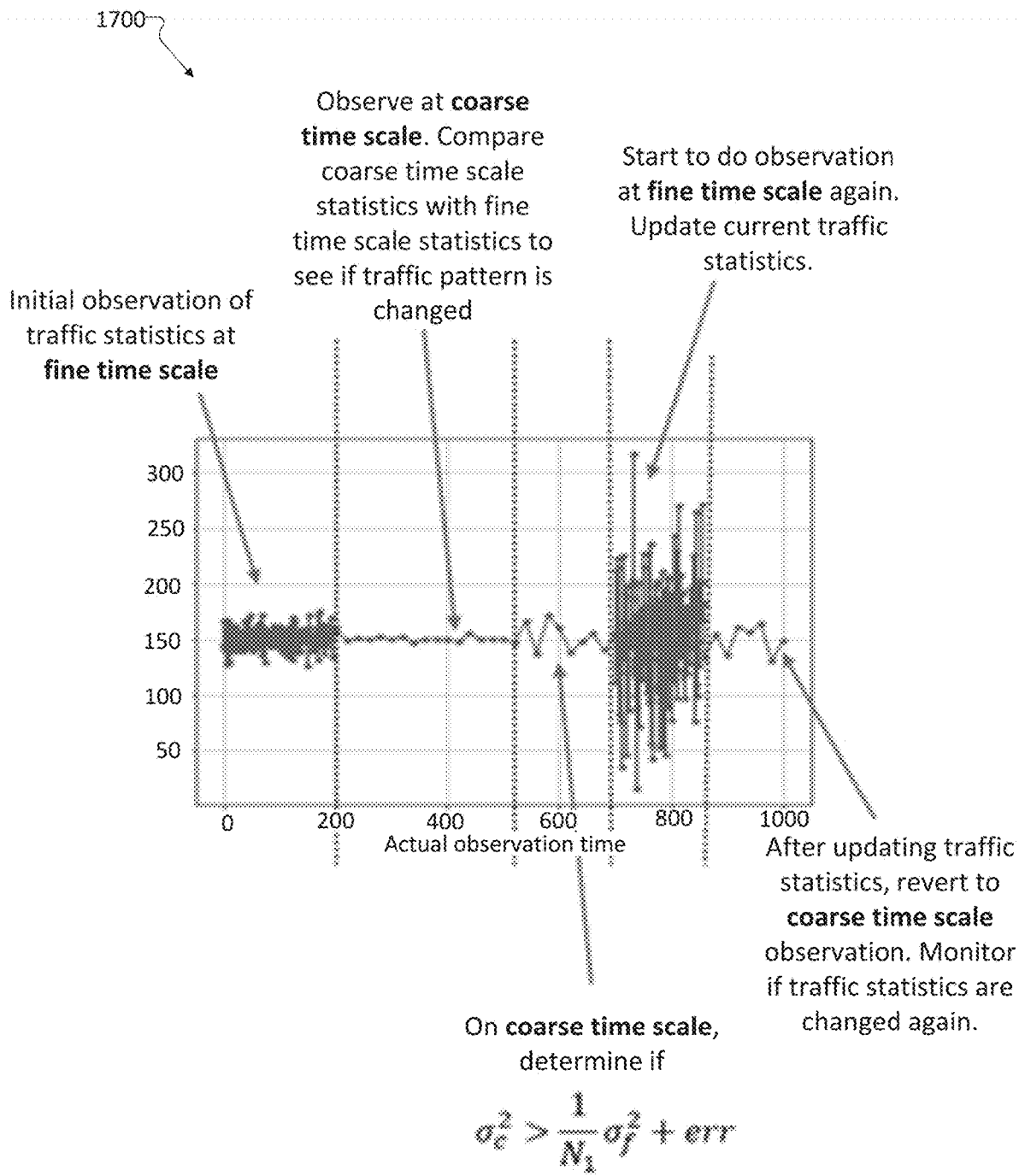
FIG. 17 illustrates a chart showing an example of using the process of FIG. 16 according to embodiments of the present disclosure.

FIG. 17 illustrates a chart 1700 showing an example of using the process 1600 according to embodiments of the present disclosure. The chart 1700 depicts dynamically updating the observation time scale for the estimation of network statistics. As shown in FIG. 17, the traffic statistics are initially observed at a fine time scale and the variation of the traffic statistics $\sigma_f$ is recorded. Then the observation is changed to coarse time scale, and the statistics of the traffic that were observed in the fine time scale continue to be used. During the time that the observation is performed in the coarse time scale, it is determined whether the variation of the statistics in the coarse time scale $\sigma_c^2$ is larger than $$\frac{1}{N_1}\sigma_f^2 + err.$$

If that is the case, then it means that the traffic statistics has changed, and the traffic statistics need to be updated at the fine time scale again. After updating the traffic statistics in the fine time scale, the STA reverts to observation at the coarse time scale and monitors if the traffic statistics is changed again by checking the condition $$\sigma_c^2 \geq \frac{1}{N_1}\sigma_f^2 + err.$$

In another embodiment, the value of $\chi_f$ can be estimated with a linear mapping of $\chi_c$. A mapping between the finely sampled data $\chi_f$ and the coarsely sampled data $\chi_c$ can be created. The values of $\chi_c$ and $\chi_f$ can be the throughput in some embodiments. In other embodiments, $\chi_c$ and $\chi_f$ can be the calculated data time $T_{dt}$. In these embodiments, a linear mapping can be observed between the coarsely and finely sampled data, which can be formulated as:

$$\chi_f = m_{boost} * \chi_c + c_{boost}$$

where $m_{boost}$ and $c_{boost}$ are the linear mapping factors used to map the coarsely calculated $\chi_c$ to an estimate of the finely calculated $\chi_f$.

In some embodiments, the coarse observation time and fine observation time are equal (i.e., $S_c = S_f$), and thus the observed data are also equal ($\chi_c = \chi_f$). In these embodiments, an exemplary time for $S_c$ is $T_{inv}$ and no estimation of fine-time scale statistics is required. The statistics calculated in these embodiments are used as is for estimation of $T_{wd}$.

Figure 18:
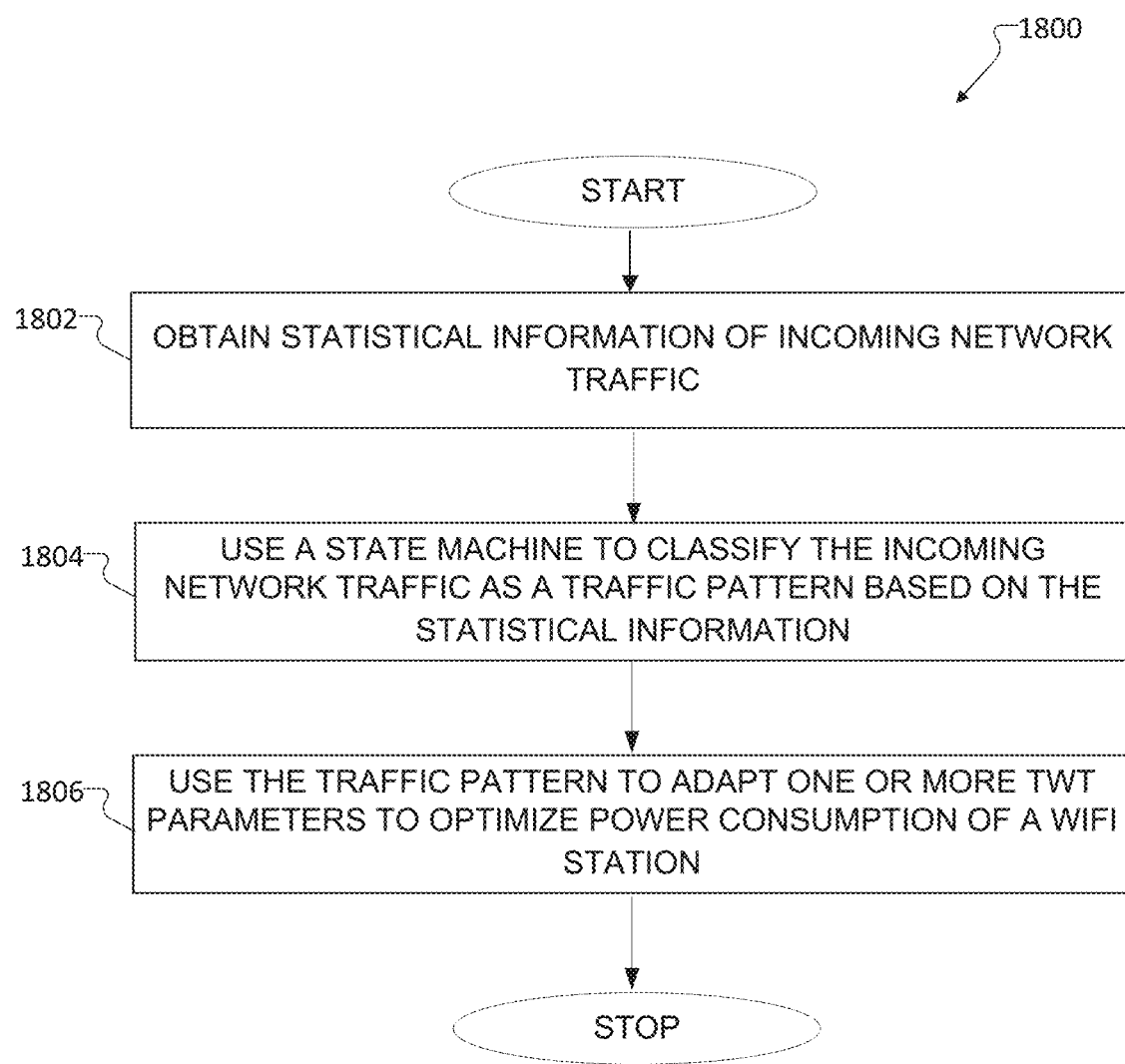
FIG. 18 illustrates a method for traffic type detection and Wi-Fi parameter design according to embodiments of the present disclosure.

FIG. 18 illustrates a method 1800 for traffic type detection and Wi-Fi parameter design according to embodiments of the present disclosure, as may be performed by a STA (e.g., one of the STAs 111-114 as illustrated in FIG. 1). An embodiment of the method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

As illustrated in FIG. 18, the method 1800 begins at step 1802. At step 1802, a STA obtains statistical information of incoming network traffic. This could include, for example, the STA 111 obtaining statistical information of incoming network traffic from the AP 101, including throughput, average throughput, instantaneous throughput, traffic bursts, traffic valleys, traffic anomalies, TWT wakeup time, TWT service period, and the like. In some embodiments, the statistical information can be obtained at a fine time scale, a coarse time scale, or both.

At step 1804, a state machine is used to classify the incoming network traffic as a traffic pattern based on the statistical information. This could include, for example, the STA 111 implementing the state machine 900 to classify the incoming network traffic as at least one of bursty traffic, random traffic, and stable traffic.

At step 1806, the traffic pattern is used to adapt one or more TWT parameters to optimize power consumption of a Wi-Fi station. This could include, for example, the STA 111 using the traffic pattern to adapt at least one of an overflow threshold, an overflow threshold percentage, an overflow guard, and overflow update, a stable guard, a stable update, a boost multiplier, or a boost offset, in order to optimize power consumption of the STA 111.

Although FIG. 18 illustrates one example of a method 1800 for traffic type detection and Wi-Fi parameter design, various changes may be made to FIG. 18. For example, while shown as a series of steps, various steps in FIG. 18 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   obtaining statistical information of incoming network traffic;
   using a state machine to classify the incoming network traffic as a traffic pattern based on the statistical information; and
   using the traffic pattern to adapt one or more Target Wakeup Time (TWT) parameters to optimize power consumption of a Wi-Fi station,
   wherein the traffic pattern includes at least one of bursty traffic, random traffic, and stable traffic, and
   wherein obtaining the statistical information of the incoming network traffic comprises:
      obtaining first statistical information of the incoming network traffic at a fine time scale;
      determining whether a pattern of the incoming network traffic has changed; and
      obtaining second statistical information of the incoming network traffic at a coarse time scale having a longer observation window than the fine time scale, based on whether the pattern of the incoming network traffic has changed.

2. The method of claim 1, wherein using the state machine to classify the incoming network traffic as the traffic pattern based on the statistical information comprises:
   obtaining at least one statistical value of the incoming network traffic from the statistical information;
   determining which of a plurality of state transition conditions is met based on a comparison between the at least one statistical value of the incoming network traffic and one or more predetermined threshold values;
   inputting the met state transition condition and a previous traffic pattern of the incoming network traffic to the state machine to classify the incoming network traffic as the traffic pattern; and
   outputting the traffic pattern from the state machine.

3. The method of claim 2, wherein the at least one statistical value comprises one or more of: a throughput of the incoming network traffic, a moving average of the throughput of the incoming network traffic, or a time duration of a current burst of the incoming network traffic.

4. The method of claim 2, wherein the plurality of state transition conditions are grouped as bursty traffic conditions, stable traffic conditions, and random traffic conditions.

5. The method of claim 1, wherein:
   the one or more TWT parameters comprises at least one of: an overflow threshold, an overflow threshold percentage, an overflow guard, and overflow update, a stable guard, a stable update, a boost multiplier, or a boost offset; and
   using the traffic pattern to adapt the one or more TWT parameters to optimize power consumption of the Wi- Fi station comprises using a different calculation or value for the one or more TWT parameters depending on whether the traffic pattern is bursty traffic, random traffic, or stable traffic.

6. The method of claim 1, wherein obtaining the statistical information of the incoming network traffic further comprises:
  comparing a first variance of the first statistical information to a second variance of the second statistical information;
  determining whether the pattern of the incoming network traffic has changed based on the comparison between the first variance and the second variance;
  in response to determining that the pattern of the incoming network traffic has changed, obtaining third statistical information of the incoming network traffic at the fine time scale; and
  in response to determining that the pattern of the incoming network traffic has not changed, continuing to obtain the second statistical information of the incoming network traffic at the coarse time scale.

7. The method of claim 1, wherein the one or more TWT parameters comprises at least one of: an overflow threshold, an overflow threshold percentage, an overflow guard, and overflow update, a stable guard, a stable update, a boost multiplier, or a boost offset.

8. A device comprising:
  a memory configured to store instructions; and
  a processor operably connected to the memory, the processor configured when executing the instructions to:
    obtain statistical information of incoming network traffic;
    use a state machine to classify the incoming network traffic as a traffic pattern based on the statistical information; and
    use the traffic pattern to adapt one or more Target Wakeup Time (TWT) parameters to optimize power consumption of a Wi-Fi station,
    wherein the traffic pattern includes at least one of bursty traffic, random traffic, and stable traffic, and
    wherein to obtain the statistical information of the incoming network traffic, the processor is configured to:
      obtain first statistical information of the incoming network traffic at a fine time scale;
      determine whether a pattern of the incoming network traffic has changed; and
      obtain second statistical information of the incoming network traffic at a coarse time scale having a longer observation window than the fine time scale, based on whether the pattern of the incoming network traffic has changed.

9. The device of claim 8, wherein to use the state machine to classify the incoming network traffic as the traffic pattern based on the statistical information, the processor is configured to:
  obtain at least one statistical value of the incoming network traffic from the statistical information;
  determine which of a plurality of state transition conditions is met based on a comparison between the at least one statistical value of the incoming network traffic and one or more predetermined threshold values;
  input the met state transition condition and a previous traffic pattern of the incoming network traffic to the state machine to classify the incoming network traffic as the traffic pattern; and
  output the traffic pattern from the state machine.

10. The device of claim 9, wherein the at least one statistical value comprises one or more of: a throughput of the incoming network traffic, a moving average of the throughput of the incoming network traffic, or a time duration of a current burst of the incoming network traffic.

11. The device of claim 9, wherein the plurality of state transition conditions are grouped as bursty traffic conditions, stable traffic conditions, and random traffic conditions.

12. The device of claim 8, wherein:
  the one or more TWT parameters comprises at least one of: an overflow threshold, an overflow threshold percentage, an overflow guard, and overflow update, a stable guard, a stable update, a boost multiplier, or a boost offset; and
  to use the traffic pattern to adapt the one or more TWT parameters to optimize power consumption of the Wi-Fi station, the processor is configured to use a different calculation or value for the one or more TWT parameters depending on whether the traffic pattern is bursty traffic, random traffic, or stable traffic.

13. The device of claim 8, wherein to obtain the statistical information of the incoming network traffic, the processor is further configured to:
  compare a first variance of the first statistical information to a second variance of the second statistical information;
  determine whether the pattern of the incoming network traffic has changed based on the comparison between the first variance and the second variance;
  in response to determining that the pattern of the incoming network traffic has changed, obtain third statistical information of the incoming network traffic at the fine time scale; and
  in response to determining that the pattern of the incoming network traffic has not changed, continue to obtain the second statistical information of the incoming network traffic at the coarse time scale.

14. The device of claim 8, wherein the one or more TWT parameters comprises at least one of: an overflow threshold, an overflow threshold percentage, an overflow guard, and overflow update, a stable guard, a stable update, a boost multiplier, or a boost offset.

15. A non-transitory computer readable medium comprising a plurality of instructions that, when executed by at least one processor, is configured to cause the at least one processor to:
  obtain statistical information of incoming network traffic;
  use a state machine to classify the incoming network traffic as a traffic pattern based on the statistical information; and
  use the traffic pattern to adapt one or more Target Wakeup Time (TWT) parameters to optimize power consumption of a Wi-Fi station,
  wherein the traffic pattern includes at least one of bursty traffic, random traffic, and stable traffic, and
  wherein to obtain the statistical information of the incoming network traffic, the plurality of instructions is configured to cause the at least one processor to:
    obtain first statistical information of the incoming network traffic at a fine time scale;
    determine whether a pattern of the incoming network traffic has changed; and
    obtain second statistical information of the incoming network traffic at a coarse time scale having a longer observation window than the fine time scale, based on whether the pattern of the incoming network traffic has changed.

16. The non-transitory computer readable medium of claim 15, wherein to use the state machine to classify the incoming network traffic as the traffic pattern based on the statistical information, the plurality of instructions is configured to cause the at least one processor to:
- obtain at least one statistical value of the incoming network traffic from the statistical information;
- determine which of a plurality of state transition conditions is met based on a comparison between the at least one statistical value of the incoming network traffic and one or more predetermined threshold values;
- input the met state transition condition and a previous traffic pattern of the incoming network traffic to the state machine to classify the incoming network traffic as the traffic pattern; and
- output the traffic pattern from the state machine.

17. The non-transitory computer readable medium of claim 16, wherein the at least one statistical value comprises one or more of: a throughput of the incoming network traffic, a moving average of the throughput of the incoming network traffic, or a time duration of a current burst of the incoming network traffic.

18. The non-transitory computer readable medium of claim 15, wherein:
- the one or more TWT parameters comprises at least one of: an overflow threshold, an overflow threshold percentage, an overflow guard, and overflow update, a stable guard, a stable update, a boost multiplier, or a boost offset; and
- to use the traffic pattern to adapt the one or more TWT parameters to optimize power consumption of the Wi-Fi station, the plurality of instructions is configured to cause the at least one processor to use a different calculation or value for the one or more TWT parameters depending on whether the traffic pattern is bursty traffic, random traffic, or stable traffic.

19. The non-transitory computer readable medium of claim 15, wherein to obtain the statistical information of the incoming network traffic, the plurality of instructions is configured to cause the at least one processor to:
- compare a first variance of the first statistical information to a second variance of the second statistical information;
- determine whether the pattern of the incoming network traffic has changed based on the comparison between the first variance and the second variance;
- in response to determining that the pattern of the incoming network traffic has changed, obtain third statistical information of the incoming network traffic at the fine time scale; and
- in response to determining that the pattern of the incoming network traffic has not changed, continue to obtain the second statistical information of the incoming network traffic at the coarse time scale.

20. The non-transitory computer readable medium of claim 15, wherein the one or more TWT parameters comprises at least one of: an overflow threshold, an overflow threshold percentage, an overflow guard, and overflow update, a stable guard, a stable update, a boost multiplier, or a boost offset.

* * * * *